United States Patent
Kennedy

(10) Patent No.: US 10,852,921 B2
(45) Date of Patent: Dec. 1, 2020

(54) METHOD OF GATHERING, STORING, AND DISTRIBUTING USER DEFINED GEOGRAPHIC LOCATION IDENTITIES

(71) Applicant: Latloc, LLC, Glastonbury, CT (US)

(72) Inventor: Scott Kennedy, Glastonbury, CT (US)

(73) Assignee: Latloc, LLC, Glastonbury, CT (US)

( * ) Notice: Subject to any disclaimer, the term of this patent is extended or adjusted under 35 U.S.C. 154(b) by 334 days.

(21) Appl. No.: 15/391,338

(22) Filed: Dec. 27, 2016

(65) Prior Publication Data

US 2018/0059909 A1 Mar. 1, 2018

Related U.S. Application Data

(60) Provisional application No. 62/379,526, filed on Aug. 25, 2016.

(51) Int. Cl.
*G06F 3/0484* (2013.01)
*G06F 16/29* (2019.01)
*G06F 16/25* (2019.01)

(52) U.S. Cl.
CPC ........ *G06F 3/04842* (2013.01); *G06F 16/252* (2019.01); *G06F 16/29* (2019.01)

(58) Field of Classification Search
CPC ...... H04W 4/025; H04W 4/029; H04W 64/00
USPC .......................................... 707/736; 701/461
See application file for complete search history.

(56) References Cited

U.S. PATENT DOCUMENTS

| | | |
|---|---|---|
| 6,985,588 B1 | 1/2006 | Glick et al. |
| 7,007,228 B1 | 2/2006 | Carro |
| 9,191,352 B2 | 11/2015 | Parmar et al. |
| 2005/0209815 A1 | 9/2005 | Russon et al. |
| 2010/0289675 A1 | 11/2010 | Ueda |
| 2011/0078359 A1* | 3/2011 | Van Dyke ........... G06F 12/0607 711/5 |
| 2015/0024778 A1* | 1/2015 | Granito .................. G01C 21/00 455/456.1 |
| 2015/0134241 A1* | 5/2015 | Kavranoglu ...... G06F 17/30241 701/461 |

(Continued)

OTHER PUBLICATIONS

Hendrix, P., "Location, the Epicenter of Mobile Innovation in 2010," (Feb. 2010).

(Continued)

*Primary Examiner* — Hung T Vy
(74) *Attorney, Agent, or Firm* — Carmody Torrance Sandak & Hennessey LLP

(57) ABSTRACT

A system and method facilitated on the Internet wherein users connected to the Internet via a system comprised of, a computer driven mobile GPS and/or AGPS enabled device, or, a stationary or portable computing device capable of connecting to the Internet, a corresponding mobile application and/or website portal with user account access, and an Application Programming Interface (API) for the user to interact with a user centric secure online database, engage with a method of constructing, saving, and sharing user defined specific geographic point location identity data sets or files exclusively that is not designed as a social interaction community involving tracking or proximity sensing of the user device. A system and method that is designed and intended for the purposes of constructing, saving, modifying, and sharing user defined geographic location identity data sets or files exclusively and absent requirements of engaging in actively tracking user devices.

13 Claims, 8 Drawing Sheets

(56) References Cited

U.S. PATENT DOCUMENTS

2016/0073225 A1\* 3/2016 Ganesalingam ...... H04W 4/021
  455/456.1

\* cited by examiner

METHOD OF GATHERING, STORING, AND DISTRIBUTING USER DEFINED GEOGRAPHIC LOCATION IDENTITIES

BACKGROUND OF THE INVENTION

One of the most elusive solutions in the development of computer driven location aware and navigation technology has always been pinpointing a method of providing highly specific and intimate accuracy to a mobile device-driven personal navigation and engagement of the geophysical location experience. Through the development of highly capable hardware, coupled with application and software designs, we have come to the point in navigation technology where we can enter an address, enter a specific business name, or drop a pin onto a map in our smartphone mobile device, and an individual can navigate right to that address, business, or point with a relatively high degree of accuracy, especially if this location is in a well populated area. This is driven by the ability of currently available navigation systems being able to track the position of the device equipped with a GPS antenna and receiver and get the user as close as possible with available computer driven methods by vehicle with the pre-loaded available land routes the mobile device is aware of or by interactively communicating with an Application Programming Interface (API) while connected to the internet.

Some devices can then be switched to walking mode, which will enable to the user to be pointed in the direction of that address, business, or point of interest that was entered in to the application on the mobile device to allow the user to then proceed on foot from his or her closest navigation point by vehicle.

As technology advances, the ability of computerized systems and devices has continuously attempted to define a more granular capability for personal use of navigation in the form of smartphone technology. Hand held computer driven GPS and AGPS enabled navigation devices have made extraordinary advances, since their creation, in their capability of providing a quite accurate navigation experience for the users of these devices. But there are glaring limitations that many have failed to adequately resolve in order to bring the users productive engagement with these devices in line with the truly extraordinary capabilities these devices currently possess. A proper solution method should be a readily and usefully adaptive method, not only to current GPS and AGPS enabled technology, and as being a useful stand-alone tool for the storage of specifically descriptive location identities, but should also be readily and usefully adaptable to future advances of the many technologies that interact with location in general that include these mobile navigation devices. A similarly adaptive solution method that has been successfully integrated into all technology relevant to location is the road/route naming/numbering and street address system of assigning the names of streets and numbers on houses or buildings. Street names and numbers are in effect theoretical but have become tangible assets as assigned by users to create logical access to location for a very long time. Zip codes were a further refinement of that system. The street mapping system has been the successfully adopted platform for land navigation for driving in computer systems up to its current status in computer technology of amazingly accurate navigation from one street address to another even with its given limitations. But as we move into this new phase of technology having the capability of intimate visual context for the user through the use of displayed satellite imagery, of which the user is intimately familiar with, users interacting with these high clarity images are capable of identifying highly specific point locations within the boundaries of a parcel of land that are just as important, if not more important in their personally interactive relevance to computer technology engaged with by the user as individually specific location, because of this very granular capability. Even with all of this amazing technological advancement, where technology can be so specific as to be able to guide the user to a selected pin point location, we are still at a point where there are still so many stark inaccuracies and inefficiencies in the use experience of these devices. Oftentimes, when the device has determined that a user has arrived at the intended destination, the user may be far from that specific location. Quite often, VERY far from their intended point in the navigation experience.

The solution to this problem has been quite elusive for a very long time and the answer should be quite obvious given the power and capability of computer technology being able to define the latitude and longitude coordinates right down to the head of a pin, right? Not so simple, not so obvious.

There are two main factors that reinforce the unique nature of the solution described herein. The first is the fact that we have collectively been relying on advancing technology itself to solve the problem of specific accuracy. "Location" as a general term in technology has been pretty much separated from how the interaction of the word "location" would be traditionally defined by the human user as a practical matter in the context of ordinary conversation. More basically, as a computer terms it has been abbreviated in most cases which can lend to some confusion in the specific definitions of new methods. As location becomes more integral to so many different and applicably specific computer driven methods, it is important that we become more specific in how the term "location" is defined. This sort of separation from the common human user definitions and interpretations of the term "location" in computer process definition language has led to the automatic assumption that in the computer driven world the term location revolves around the physical position of a device. For example, the term "location sharing" is specifically defined as sharing ones physical location while in possession of a location aware and location enabled device. In reality, this type of sharing by true definition is technically "device location sharing" but the assumption because it is in reference to a computer driven method that "location sharing" is automatically assumed to be a device connected to a human. The herein described method, by allowing the user to specifically and manually select the specific geographic point of location the particular user desires to be defined and in turn shared with other users, is in fact the truer form of "location sharing."

Even more specifically, when sharing a geographical position using a mobile device, geotagging could be defined more properly as "sharing my device location" and the herein described method would be described as "sharing a location" as a proper differentiation of these two methods. This difference is a highly pivotal clarification as it determines the specific nature of the interaction with the mobile device and creates a very different level of perceived and actual specific accuracy, thus creating a more productive result. It also refines the definition of the true impact the herein described method can have on technology as a whole as a tool for sharing specific location identities when considered in its preferred embodiment.

Secondly, through the development of personal navigation devices and software that have location aware capabilities, we still cling to the notion that location information in a general sense is something that gets categorically buried or integrated into the designed software or method, including, for example, navigation application technology, geotagging of a photo (which is a device present operation), a social networking product or application with location aware capabilities, or for looking for a street address or a "place"/point of interest (POI) in a mapping or navigation application/program. So what has happened is that the entirety of the experience is designed around technology being in control of the specifics of the location engagement, leaving out the user from having the capability to manually select their own specific point and give that point their own unique definition in an environment in which they have total control over what precise location is selected (which can be distinguished from geotagging, which requires that the device be present at the desired location to be defined) and what the user requires as a useful definition placed on that location within one application experience.

The system and method described herein provide the capability to the user to completely customize the location engagement experience and descriptive content precisely for their own specific use requirements exclusively as its own complete experience exclusive of any other operations of navigation or socially interactive experiences.

It has never been considered to remove location descriptive content from mapping and navigation products because these products have a broader view in mind for their purpose. But as technology begins to expand its capabilities into a far more clearer look at the navigable ground surface, the user can use familiarity of the available image and demand a method that will facilitate a more granular and specific selection ability of very specific locations of intimate interest to them visible on the ground, and not something that would be displayed on a generally accessed mapping product for public view.

It is important to establish a method that can provide a simplified process in which to communicate the detailed information that can efficiently and accurately distribute any particular user's specific and personally descriptive interpretation of not only the specific point of a location on the physical terrain, but also descriptive of the physical characteristics (if necessary) in the user experience of these mobile devices in addition to any description of an intended event or interaction that is either intended to occur, or that has occurred in the past. Location, as a general term, can be expanded in relevance to be one of the most important aspects of the digital world. In addition, location requires its own unique and efficient user specific standard of digital communication of geographical location for users to interact more accurately and precisely with the digitally replicated physical world that is not associated specifically to the tracking of the users mobile device for social interaction or the user having only access to pre-generated content for navigation that may not have specific relevance to the specific user experience.

Furthermore, there is no true file type protocol that exists to addresses the specific content of this sort of user defined geographic location point identity data because it has never been the case that location in the general sense should be its own exclusively defined data set commodity outside of any of each of the application or software products that use location descriptive input by the user. As described previously, location descriptive data has always been buried or imbedded into the product as an input category and a part of the whole instead of a specific file type protocol dedicated to the descriptive content and actionable interactivity of location specific data that comes from outside the application product or program, similar to what a PDF would be for data and graphics.

In an alternate embodiment, by developing the herein described method a platform is created to effectively facilitate the input of user defined geographic location identity data established by the registered users of the herein described method directly into a file type protocol that establishes each of the user's saved location identities as an individual file and create a unified location identity specific communication language across any platform that is designed as capable of reading this geographic location data specific file protocol and its exclusive file extension.

In the progression of navigation and location aware technology, there always needs to be next step methods that can bridge the gaps that facilitate the next phases of detailed capability with the advancing of location aware technology. We are now able to see far more finite locations that the user of the herein described method can point to that are far more precise than the broader area designation of a street address alone.

In other words, the street address represents the parcel of land at that address location, while the method described herein allows for the point location identity for street based navigation more precisely to be placed at the specific entry point of the address. Additionally, many street addresses are not properly displayed on publicly available digital navigation maps and in GPS navigation systems and applications. With recurring use, the accuracy gets better over time, but then we enter into the situation of the changing dynamics of the location identities previously established. If the operations of a location has changed and now creates a new entity in its place, or the actual access routes to a location has been changed, the method described herein can be used to immediately reflect those changes and the user can supply up to date navigation information that would normally take time to have represented on the community supplied mapping products which require moderation protocols to implement the changes.

The method described herein provides the immediate detail required to provide an instant solution for accurate navigation to the location under the control of the user specifically. If the user provides permission to a third party application or software, such that may monitor changes in the particular user defined location identity file of a particular verified user of the herein described method, these changes could be immediately reflected in that third party application or software.

In addition, what may prove to be in the future one of the most transformational aspects of the establishment of a specific and unique method of giving the user the ability to define and share highly detailed and uniquely specific descriptive information of specific location points is the analytic value of human descriptives being placed on geographic locations in general. As the system proliferates with users of the herein described methods, a massive amount of human descriptive and interpretive values are placed on geographic land points describing the terrain, objects located at a particular land point, as well as the multitude of different interactive events associated to any particular land point. The analytical value of human descriptives being labeled on similar objects as well as interactions either past or planned in the future is completely limitless. The possible effects on computer driven interpretive value in spatial recognition specific to environmental conditions or present geography is simply fantastic to consider. This possibility alone makes a very strong case for the need of a uniquely specific method of constructing, saving, and storing specifically user defined geographic location identities as standalone data sets or uniquely formatted files in a system API and corresponding mobile application and website access process that is not a part of a tracking or socially interactive method as specifically provided by the method described herein.

Because of the continued progression towards more granularity in useful mobile relevant geographic data, mobile device users continue to move toward more intimate interactions with these smartphone mobile devices and are demanding a higher level of specific accuracy and productivity in the personal navigation experience. There is an emerging need to place a descriptive identity on far more accurately specific location "points" to define more specific interactions than simply adding note data associated to locations that are generally represented on these geographic satellite images or maps as a larger "place," and not as specifically and accurately defined points. There needs to be a system of identification that addresses the specific importance of each geographic location and its relevant importance to the user individually with a method that can be universally interactive for productive use on all mobile computer systems. The method described herein facilitates the user's need by allowing the user to specifically define those specific location points that are of value and interest to them specifically and provide a means to be able to share this useful data with other users and applications and will benefit the entire mobile device using public by creating a unified platform to communicate highly granular geographic location specific data in a simplified fashion across many different platforms. In sum, the method described herein is designed to isolate the user experience to those elements that create a more usefully intimate engagement experience with location related data, but allows the first user to provide chosen second users, trusted contacts, and trusted applications the ability to become a part of the engagement to expand the relevant content to increase the quality of the engagement experience by enriching the content for the user with information they can deem relevant to the specific use requirements without a flood of irrelevant preloaded content on the satellite or map image of the method application.

When it comes to the generalized term "location," any one specific location can have a number of different meanings and interactions relevant to many different users of the exact same geographic location. Given that notion, in order to truly define any particular location accurately to make it relevant to any specific users unique and specific interaction with that location for a user that is interacting with the location using a computer driven device, be it a person with a mobile GPS device, a GPS enabled smartphone device, or an automated piece of equipment that is computer driven by location aware software or applications, the specifics of location and its defining characteristics related specifically to the user's intentions of any specifically selected geographic point truly needs to be its own stand-alone commodity for use on location aware devices regardless of the location aware process or method they are performing.

As an example, I ran into a problem that flipped on a light switch that helped me to identify the quite non-obvious solution. I was trying to get a large number of individuals to a highly remote location of a plant in a remote area, where the security guard shack was essentially turned into a telephone answering center during service shut downs, to help guide repair contractors to the location. I pulled up a satellite image of the power plant and realized that the address that was being shown on the image was attached to the building and not the actual entrance to the location. By using that particular spot as the point to be navigated to, there was never going to be an accurate navigable route to follow or vehicle accessible pin point location for the GPS to navigate to. So, I zoomed in on the front entrance driveway to the power plant, the entrance of which was a dirt driveway along a route with many such dirt driveways and has a very small white sign, selected it on the satellite image, wrote the coordinate points on the top of a piece of paper with instruction to each individual to put these coordinates into their GPS unit and hit "navigate to", wrote description of the little white sign, so they knew what to look for and the proper side of the road to look for it, wrote the directions after turning into the driveway of when and where to take a left and a right in the web of dirt driveways they would encounter on their way into the facility, took a picture of this piece of paper, and texted it to all of my workers coming to the power plant. Every one of those workers that were capable of inputting the coordinates properly into their GPS made it to the site with no issues. Only two needed to be guided in because they couldn't figure out how to enter the coordinate points. The staff at the plant was mesmerized at how I was able to get all of these workers to the site so specifically without any additional instruction as they had never been there before. Even to this day I understand that this is still an issue for many visiting this plant.

Then it hit me. As advanced as technology has become in being capable of navigating to any specific location point, there will never be a point where the computer driven device will inherently know the many human descriptions that make up the human interpretations of the term "location" aside from the coordinate points of latitude and longitude. The only way to establish that sort of specific accuracy is by combining those specific coordinate sets of latitude and longitude with a personalized human description of not only the land location and its physical attributes or objects located at that land point, but also be able to describe any sort of interactions that may need to occur once one has arrived there. The only solution is to have the two elements of the computer driven latitude/longitude coordinates married to a specific user defined identity of the specific point to produce an extremely specific experience of interacting with any specific location as a unified data set or file type readily readable by a computer driven GPS or AGPS enabled device and not just a street address. All of the detail of the location and the proposed interaction needs to be personalized when it comes to the more intimate navigation experiences. The only way to do that is to fuse the coordinates together with the interactive details and have the process of creating this collective identity all in one process or method.

The efficiencies created by the development of standalone user defined geographic location identities stored on the Internet and used for interactions by third party applications and programs beyond simple navigation and used as a tool for location inventory and sharing the location of assets present on the physical landscape is absolutely staggering. There are also many more technological advancements that become capable simply because this newly developed commodity exists to take advantage of its interactive possibilities as computers begin to learn the more human definitions of the physical world. This method of commerce on the Internet is the starting point and creation of a new and very potent digital commodity to be used by computer driven GPS and AGPS enabled devices to raise the effective accuracy of the personal navigation experience.

With all of these location information gathering methods for mapping gaining traction and the rapid pace at which solutions are being produced to achieve a more accurate and feature rich experience using mobile GPS enabled devices, the one specific method that has eluded detection of consideration is the specific need for the user to be able to design and engage location with their own specifically defined user relevant descriptives for their own personal scope of use.

With all of the efforts to create a more defined navigation or engagement experience with digitally produced maps or satellite images by use of advancing technology, the one critical association that has never been made is that the most critical point of gaining a more efficient user experience for the user specifically is to allow the user to define their engagement with any particular location specifically in their own unique and personal interpretation of any specifically chosen geographic location and its attributes.

Technology as a whole has developed an understanding of the value of allowing user input to refine the real-time accuracy of location descriptive information. However, it is still does not allow the user to easily define their own unique interactive value of location as the point value is moderated to determine appropriateness of display on an applications map. Because of the evolutionary nature of location and the way human interaction with location can be so uniquely different from one person to another, the present invention provides the capability to the user to infinitely defined location in their own intimately personalized way.

"Location, the Epicenter of Mobile Innovation in 2010," by Phil Hendrix, PhD provides a collective observation of how the industry has addressed the issues of location and geographical information and the specific nature of how this description has carried through the progression in developments in technology to date.

With there still being the lack of a method to allow a user to specifically define a location in terms unique to the specific user, the industry forgets the most important part of the navigation or location interactive equation—the user. It is the user's familiarity with a visual inspection of the physical landscape that defines the experience the user chooses to engage with. The only true way to gain access to those specific definitions is to provide the user with a tool that allows the user to interact with the physical landscape using their own interpretive value. By allowing the user to manually select a specific point of geographic location and define it based on their own interpretive value or description, the herein described method provides that access in a way not capable with currently available methods.

User defined geographic location identity will play a critical role in the future of intimately accurate representation of location in personal user experiences simply because the same location point can in reality be used by a large number of different individuals for many different use case experiences, even if the owner of the specific location is different from the user. Location can not only refer to the land point, but also a proposed or past interaction at any particular location. A telephone pole can be identified as owned by the power company in one use case and a designated landmark position for a school bus stop for another user. Yet again, it can be the point of where a car accident may have occurred in the past. Not all of these use case instances are of public interest, but are rather a point of specific interest to the user that engages with that specific location point and its associated interactive or descriptive context. Location, or even the same location, in reality can be very personal and intimately specific from one user to the next. In order for use of the GPS and all of the connected devices to become as intimately capable of the specific accuracy they can provide to the user for their individually unique needs, there absolutely needs to be a specifically unified method provided to the general user to define location with their own specific interpretative descriptions and definitions, and, have these geographic location identities become a standalone commodity that remain as standalone data sets or files to be used as a method of location specific input for location aware devices and not as an operative part of a tracking or socially interactive platform. By use of the method described herein, a more simplistic, secure, critically accurate, and usefully specific experience is provided to the user of this information in the interaction with these specifically defined locations.

This does not mean that all of the locations defined by users that are stored in their independent user accounts within the herein described method data banks need to be presented on the generally accessible and universally available map and satellite displays used by many users simultaneously such as a Google Maps display or an Apple Maps display of points of interest or places. Display of these very specific location identities needs only be limited to the individual user defining these locations or to those the user chooses the location be shared with specifically as provided by the herein described method. The sharing of location specific data used in the herein described method will be for accurate depiction for one on one communication of specific locations within a larger parcel of land more specific than simply the street address which depicts that larger portion of land which can contain many individually specific locations of value to the user in a personal navigation experience. The method described herein also provides a level of security to the users because these intimately private locations are developed within a secured user controlled account and are not shared with the general public. As well, no one is being tracked by their mobile device unless they are using a third party navigation method to get to that shared location identity provided by the herein described method. However, as stated, that tracking is happening in the third party application and not within the herein described method. But to refine the accuracy of the personal navigation experience for the user, there needs to be a method that puts the control of the specifically defining attributes of any location of personal value to the user, into the hands of the user specifically. The herein described method is that method definitively.

As technology gains more traction in the ability to recognize and interpret human definitions and interpretations, user defined location identities with specifically granular detail will become an extremely powerful tool for algorithmic analysis. The method described herein provides a very accurate and specific tool and method of providing efficiently accurate detail to interact with and share to create a more intimate and personalized user experience working and interacting with geographic location relevant data. The more technology advances, the farther the importance of the specifically defining human characteristic definitions of the physical landscape becomes. The method described herein is an essential tool to gain access to those highly granular and specific defining characteristics of the physical geographic landscape as supplied by those users providing individually unique descriptive content and how humans interact with it in a more personally defined context.

SUMMARY AND OBJECTS OF THE INVENTION

It is an object of the present invention to allow a user to specifically define a location in terms unique to the specific user. It is another object of the present invention to provide an application programming interface that allows the user to input information related to physical location and a description thereof.

It is still another object of the present invention to provide a mobile device application that allows the user to specifically input a descriptive definition of a location, including the ability to attach location descriptive photos, video clips, and audio clips, independent of navigation activities or tracking of the mobile device.

It is yet another object of the present invention to provide an application programming interface that allows the user to permit third party applications access to preconstructed GEOLOID files by granting permission so that the third party application can use the preconstructed location identities of the user to enrich the third party application experience.

It is still another object of the present invention to provide an internet website portal where users can access their established user account or create a new account to become a registered user of the herein described method and perform the input of and interaction with a descriptive definition of a location, including the ability to attach location descriptive photos, video clips, and audio clips.

To that end, in one embodiment, the present invention relates generally to a user-defined geographic location identity file comprising:

a) a geographic location identity representing a geographic location point manually selected or specified by a user, wherein the geographic location identity comprises a coordinate set of latitude and longitude, and b) a descriptive identity of the geographic location identity or an item placed or located at the latitude and longitude coordinate set, wherein the descriptive identity is defined by the user for their own specific use or interaction requirements.

In another embodiment, the present invention relates generally to a computer-based storage system for storing user-defined location identity files, wherein the user-defined location identity files comprise a latitude and longitude coordinate set and a plurality of descriptive attributes of the latitude and longitude set defined by a user based on their requirements, the system comprising:

a) a mobile device application or website portal interface for entering the latitude and longitude coordinate set and the plurality of descriptive attitudes;

b) an interactive application programming interface storage device for storing the user-defined location identity files; and c) means for retrieving the stored user-defined location identity files for use by the user.

In still another embodiment, the present invention relates generally to an application embodied on a computer-readable medium, wherein the application is executable on a computing device and includes program instructions that, when executed, are configured to cause the computing device to:

receive user input of a geographic location identity representing a manually selected or specified geographic location point, wherein the user inputs information related to a manually selected or specified geographic location point of significance to the user;

receive user input comprising a descriptive identity that describes the manually selected or specified geographic location point;

generate a data file comprising the geographic location point as a coordinate set of latitude and longitude of the specific manually selected or specified geographic location point and the descriptive identity that describes the manually selected or specified geographic location point; and display one or more data files to the user on a display screen;

wherein presenting the one or more data files to the user includes presenting options to allow the user to perform a task comprising one or more of selecting the data file, modifying or changing the data contained within the file, granting permission to another user or application to access and use the data file, electronically transmitting the data file to a global positioning system enabled application or device, and electronically transmitting the data file to another user.

In still another embodiment, the present invention relates generally to a method that allows the user of either a mobile computing device using the corresponding mobile device application or a stationary computing device using the internet website portal the ability to; open a satellite image on the computing device that depicts a geographic landscape, point to and select a specific point on the satellite image that the user desires to construct a personalized descriptive identity for, confirm that the location point selected is a correct and accurate selection, fill out the pre-established data fields for descriptive content, input specific action or activity directives intended for this location if desired, attach a photo, video clip, or audio clip to the descriptive identity if desired, if a photo is attached then place a marker on the photo to signify the specific location being described in the identity data file if desired, establish if the constructed location identity is private for the user to view only, to be viewable by only approved other registered users, or viewable by all users, save the constructed location identity in the established user account, and then share the established location identity data with either other users of the method, or, text or email the location identity data to another device of another person.

DETAILED DESCRIPTION OF THE PREFERRED EMBODIMENTS

Figure 1:
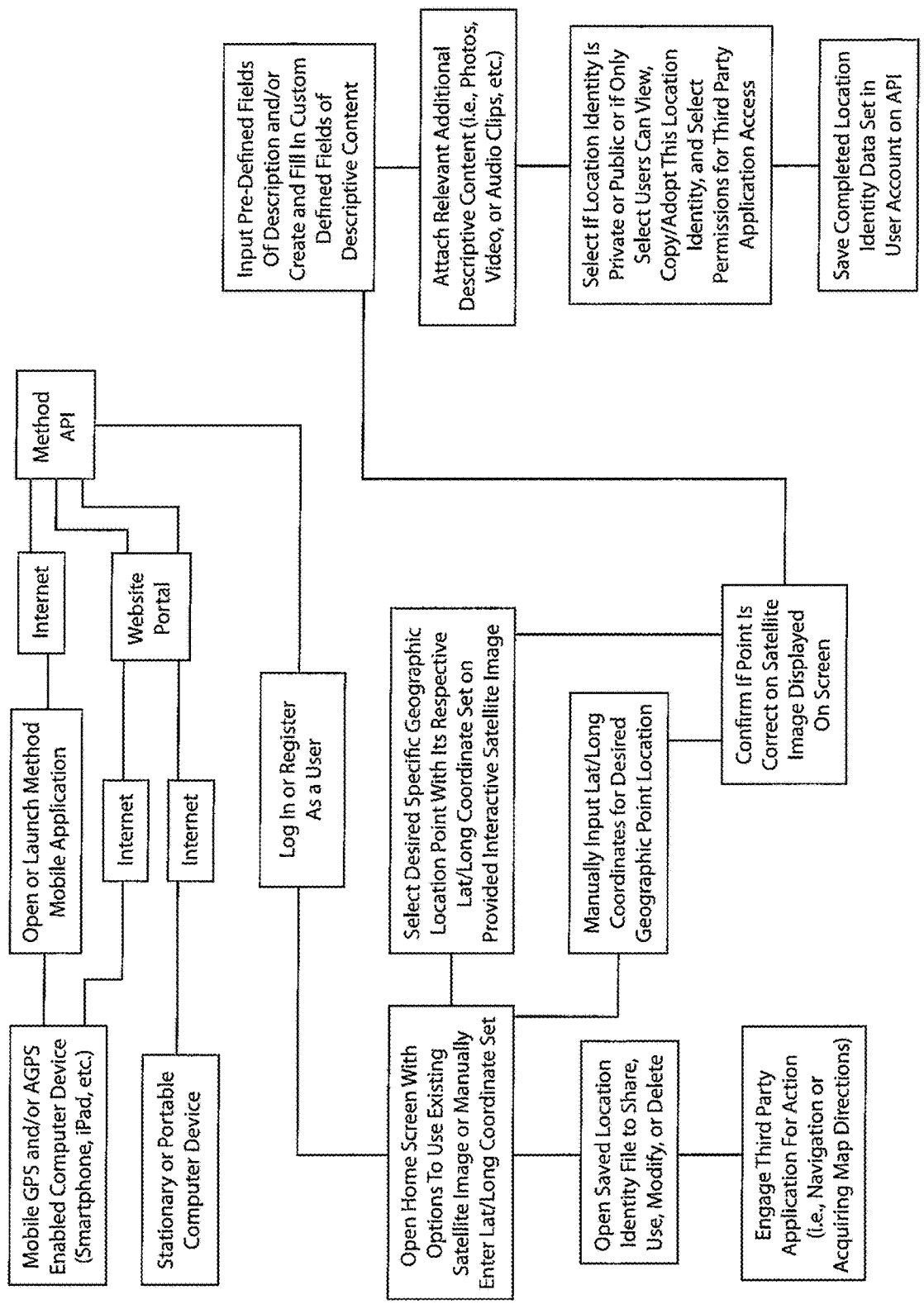
FIG. 1 depicts a flowchart for creating, storing, modifying, saving and sharing user define geographic location identities in accordance with the present invention.

As described herein, in one embodiment, the present invention relates generally to an application embodied on a computer-readable medium that is executable on a computing device and includes program instructions that, when executed, are configured to cause the computing device to:

receive user input of a geographic location identity representing a manually selected or specified geographic location point, wherein the user inputs information related to a manually selected or specified geographic location point of significance to the user;

receive user input comprising a descriptive identity that describes the manually selected or specified geographic location point;

generate a data file comprising the geographic location point as a coordinate set of latitude and longitude of the specific manually selected or specified geographic location point and the descriptive identity that describes the manually selected or specified geographic location point; and display one or more data files to the user on a display screen;

wherein presenting the one or more data files to the user includes presenting options to allow the user to perform a task comprising one or more of selecting the data file, modifying or changing the data contained within the file, granting permission to another user or application to access and use the data file, electronically transmitting the data file to a global positioning system enabled application or device, and electronically transmitting the data file to another user.

As described herein, the method also relates generally to methods and systems in which the user can:
1) Search their saved locations in their personal account by file name, keyword, proximity, category, item name, or date established, or combination thereof;
2) Search accepted users shared locations by username, file name, keyword, proximity, category, item name, or date established, or domination thereof.
3) Make their saved locations public and viewable through any search engine capable of detecting the file or data set.
4) Search the entire user database of all registered users' designated public location identities by keywords, proximity, category, or item name.

What is meant by the term "location identity" which may also comprise "user defined geographic location identity" or "geographic location identity" is a uniquely individual description assigned to a specifically selected geographic location point.

By "geographic location point" what is meant is a location point that is selected from a satellite or map image or a location point specifically designated by the user by its latitude and longitude coordinate set or any digitally representative identifier of a geographic point either outdoors or indoors that is specifically designed for use in a computer readable medium. The geographic location point may be established to a refined accuracy of at least 3 decimal places, more preferably at least 4 decimal places, more preferably at least 5 decimal places, and may exhibit a refined accuracy of 6 decimal places in a digital decimal degrees format of latitude/longitude coordinates. In the alternative, coordinates, or, any alternate digitally defined computer readable representation of a specific geographic point, and all descriptive content made to be associated with that specifically selected or designated geographic location point and assembled into a computer readable data set or file.

A "first user" is defined as the originating user in a descriptive example referring to the engagement or interaction with a user defined geographic location identity data set or file and is the registered user of the herein described method that has the primary authority to establish access permissions to an established user defined geographic location identity that the first user has constructed.

A "second user" or "third user" or "subsequent user" or "another user" or "other user" all refer to a user that is not the originating user of a specific user defined geographic location identity. A second or third user requires permission from a first user to initiate any activity involving engagement or interaction with any of another first user's established location identities stored in the account of a registered first user of the herein described method.

GEOLOID—The term GEOLOID is an abbreviation for "Geographic Location Identity" and is used herein to describe a computer readable data set or file that has been constructed by a user to assign a specifically defined descriptive identity to a physical geographic location point.

A "GEOLOID file type" is defined herein as a file type protocol designed to contain the data set that comprises the components of a complete computer readable GEOLOID data set for the purposes of organizing, distributing, and otherwise using and for the unified interoperability of engaging with user defined geographic location identities in a computer readable medium.

A "computer" refers to and includes any stationary computer device, a desktop computer, a laptop computer, a tablet, or any such similar device. Likewise, a "mobile device" refers to and includes a smart phone, a mobile GPS device, a mobile computer device and any such similar device.

By "access" or "electronic access" what is meant is the use of a stationary or portable computer device with the capability of accessing the Internet, a mobile computer device such as a smartphone or GPS navigation unit that has the capability of accessing the Internet, or any mobile device that is GPS enabled to perform the requisite task of interacting with supplied digital satellite or map imagery that may or may not be connected to the Internet to perform the aforementioned task of interacting with a supplied user defined location identity with its particular and specific geographic location at the supplied latitude and longitude convergent point.

Described herein and as broadly shown in FIG. 1, is a computer based storage system and method connected to the Internet that provides a platform for users to create/develop user defined geographic location identities (GEOLOIDS). The system and method establishes a database to be used to both elevate the specific accuracy in the personal navigation experience of the user of these GEOLOID data sets as well as provide a system for specific geographically relevant data. The system is designed to provide the specific means by which a user (who may be, for example, an individual or a person representing an entity, including a commercial, municipal, or government entity) can become a registered user with an exclusive account on the specific Application Programming Interface (API) described herein. Using the API, the user is provided with the ability to manually select a specific geographic location point on a satellite image and define and create an identity for that selected geographic location point in whatever descriptive terms the user deems fit for their personal use purposes. The user can also add photographs as well as video and audio content to the descriptive data set to create a fully defined identity to that geographic location point, and can save, modify, or share these location identities directly with other registered users of the herein described method, or, text or email the established location identity data set or composed file to another intended recipient.

The registered users will have the ability to store, retrieve, and display individual or a plurality of established location identities in their own personal user account located on the API. Registered first users of the herein described method will also be able to provide to other secondary registered users, as well as other programs and applications, permission to view selected location identities to make use of the predefined data supplied by the originating user's location identity. Second users will have the ability to, if the requisite permission is given by the first user, adopt or copy a GEOLOID and its descriptive content previously constructed and defined by a first user and can in turn redefine that GEOLOID file to reflect the interactive use requirements of the second user. This adopting or copying of the first user GEOLOID file does not remove or delete the GEOLOID file from the user account of the first user that constructed it. Rather, an exact replica of that files content becomes a new file that is now a new GEOLOID data set or composed file that is present within the adopting second users registered account to now modify to reflect the second users use requirements.

As an example, the entrance door to a busy office building that is used by many separate and unique individuals can have an individual location identity developed by each individual that uses that same door. One individual user may identify that door as "the closest entrance to Any Particular Office" while another user may give that same door the identity as "the door that needs to have its door handle replaced", and yet another user can identify this same door as "where the taxi driver will need to pick up their luggage". No one location can be exclusive in regards to who can give it a specific location identity as the location identity is only relevant to the specific user and their engagement needs.

It is important to note that tracking of the mobile devices of the users is not an operable attribute of the method and system described herein to achieve the intended result. Although the user viewing a satellite image within the API can opt to see the current position or the location of the mobile device of that particular user to localize the view of where the user is standing to expedite the selection of a particular geographic point near or around the general vicinity of the users position, interactive tracking of the user or user device is not a requirement of executing the method to produce the intended result. Thus, the method does not rely on the device to select the location to be defined. The process and method of location selected by device position is defined as "geotagging" which does not constitute any part of the method of the invention. With interactive tracking absent in the execution of this method, it is also clear that the present invention does not engage the task of notifying proximity of the first user to any other secondary user's defined location identities stored within the method, or, any other secondary user device, to specify or initiate any potential engagement with any other specifically defined location or device of a second or third user of the method.

The method described herein is designed to raise the specific accuracy and efficiency in the use experience and engagement activity in the identifying of, interacting with, and/or navigation by a third party application to, individual geographic location points as specifically defined stationary locations exclusive to the user defining either the physical land position, describing an object's relevant position in conjunction with that specifically selected geographic point, or a specific task, activity, or event associated with that geographic location point position, as defined by the user, in any particular or specific user defined geographic location identity data set or file constructed, saved, or shared using the API. This isolation of process again is a very important distinction to be made in regards to the present method and its uniqueness as compared with currently available methods.

The only point at which a second user can see a first user's particular location identity is if the second user has specific permission from the first user to see any particular location identity or plurality of saved location identities of the first user. There are no proposed engagements for social interaction. The creation of the API database is solely intended to create a singular standalone process API database and method of constructing, storing, sharing, and modifying specifically user defined geographically descriptive data sets or files exclusively, not including any interactive tracking or socially interactive methods.

The method described herein is designed to facilitate the need to consolidate a number of current individual processes and methods to establish an efficiently and effectively simplified means of saving the descriptive data content used to designate and define any geographic location relevant to each specific user in a manner most suitable for the user's individual needs of use and engagement.

Furthermore, it is important to note that the present invention is specific to the user and their own personal interpretation of value given to any specific coordinate set of latitude and longitude at its convergent point. Each saved location identity is the design of the first or originating user and can only be viewed by those second or subsequent users the first user grants permission to view or adopt to in turn be saved as a copy of the first users location identity and modified for the specific needs of the second user if preferred as previously described. The method is intended to provide a display of only those location identities that are specifically chosen to be available for view in the display field of and not individually or a plurality of location identities not designated by the user as desired to be displayed. Thus, there are no location identities that will appear into view on the first user's display screen that are prompted to appear for any reason of proximity or for purposes of showing location identities that have been established in the vicinity of the user by any other registered second users with the exception of those location identities of other second users the first user has been given permission to view and specifically selects to be viewable on their device display. The first user can only see and interact with location identities that they have been given permission access and view and then specifically select them to be visible on their display screen.

The method includes the ability to allow a user to specifically choose a specific point on a satellite image or map displayed on the computer or mobile device screen and capture that point's specific latitude and longitude coordinate set, or, manually enter the desired latitude and longitude coordinates and create a unique and personalized identity or descriptive definition of any specifically selected geographic location combined with its specific latitude and longitude coordinate set as a complete user defined geographical location identity. The user can then store these user defined location identities in their personal user account on the system as private, public, or to be only shared with friends and other approved users and applications, allow access to these location identities by other users, applications, software, or programs with requisite user granted permissions, make these location identities permanent or temporary in nature, provide relevant descriptive data pertaining to these location identities physical nature such as if this is a land location or water location.

In another embodiment, if the location identity is describing an object or item on, in, under, above, or in proximity to that particular specified geographic surface location, the user can, have the ability to add elevation to this location identity, specify if this location is indoors or outdoors, establish if the location identity is relevant to a scope of use or engagement with that location, or a combination of any of the aforementioned descriptive attributes of that specific user defined geographic location identity and its corresponding latitude and longitude coordinate set which can also contain whatever additional digital representation is used to define the specific point depicted on a satellite image of that geographic point.

In the preferred embodiment the user can then retrieve these personally and uniquely defined location identities for personal use, share these location identities with others, or modify these location identities for changes relevant to user needs.

As technology advances, there may be alternate methods of digitally defining a specific point of geographic location as depicted on a satellite image as either a replacement or a compliment to the system of latitude and longitude coordinate sets and this proposed file type protocol would facilitate the possibility of a seamless conversion between systems of geographic point identification while retaining the specifically defining identity of the physical location as defined by the user.

The method described herein provides an exclusively single stream purpose API who's activity used in commerce on the Internet is only the storage, analysis, and distribution on the Internet of the above described commodity of user defined geographic location identities, only, as a commoditized assemblage of latitude and longitude coordinate sets, together with, the respective users specifically defined attributes, and provide no other services or methods pertaining to any activities of geotagging, geofencing with a plurality of latitude/longitude point coordinate sets, navigation, route mapping, or proximity sensing activity. Users of the system will have the ability to engage a button on the screen of location identity files displayed on the screen of a GPS enabled mobile device to initiate the user's chosen third party navigation application and in turn navigate to that specific geographic point, or, can choose to get directions on a stationary computer by clicking on a button that engages the user's third party mapping product. But, within the method itself there are no systems or methods of navigation or route mapping from one point to another. This method is only a method of allowing registered users the ability, through access to the system on the Internet, to:

1) create and design user defined geographic location identity files,
2) to store, access, and share these developed files with other registered users of the herein described method or by text or email to an intended recipient as described previously, and
3) allow access to these GEOLOID files or data sets by third party programs, applications, or software as allowed by the user.

In its simplest form, the method and system described herein is an interactive storage point for the combined computer data set commodity consisting of latitude and longitude coordinate sets with the respective user's personally and specifically defined geographic location descriptive information.

In the area of computer-driven personal navigation using GPS and AGPS enabled mobile devices, there are some serious inaccuracies and inefficiencies that could have, and in fact continuously do so on numerous occasions, create some seriously negative implications. In fact, incidents arising from the inaccurate placement of improper location markers on digital maps have resulted in the demolition of the wrong house, sending folks to the wrong location for home fuel oil fill ups because the street names were inaccurate, navigate people to impassable routes, as well as guide certain people using their navigation devices unintentionally into some extremely dangerous situations, such as bridge sections that are actually out. These instances, created out of inaccuracies, inefficiencies, and inconsistencies in computer driven navigation system in general, occur numerous times daily all over the globe. Most of these inaccurate occurrences are in large part the result of rapidly advancing computerized technology having no true unified or standardized method on the user side of the use engagement of these devices of identifying location and its many different human interpretations.

Outside of hardware, software, and application development companies themselves gathering as much physical ground based data as possible and licensing that data to many other application development companies, and using correction or suggested input methods to their systems to accomplish providing as much detail as possible to the personal navigation experience, navigation and other location aware technology to date has not provided a method that provide full control over the specific description of personally useful locations to allow the user to define locations in a uniquely personal way as a productive method.

There is simply no logical way that the application provider can be aware of the specific location point of the septic tank clean out port location in the back yard of a particular home nor is it something that the application would want to place a pin on as a place of interest for the public to view their map display. There is also simply no way for navigation service providers and application development companies that develop navigation, tracking, or proximity detection technology to know the specific detail of the intimate and personal descriptions that any one person puts onto any one location in particular. With those navigation or tracking products that rely on an abundance of content to be present on the images of these products, the maps or satellite images used for display in those products would become completely overwhelmed if every location personally relevant to every user was posted on any singular map. By displaying only those specific location identities chosen by the specific user to be displayed on their personally interactive map or satellite display for any individual and exclusive use experience, a more specific and personalized engagement is created with the mobile device working with location aware technology with a much less cluttered screen display devoid of non-essential data to create a more focused and efficient experience for the user.

All of this exceptionally capable GPS technology has created an important need for the user of the GPS's personally interactive capability to create a specifically personalized location identity on any chosen location point that can, by the user, be quickly, efficiently, and personally verified as accurate by visual inspection or selection of the location on a given satellite image and its associated descriptive information that can be input, adapted, and implemented with highly efficient and effective accuracy into a file format or data packet that can be effectively utilized on their personal computing devices for their personal use needs.

With the absence of a singular unified and standardized method that allows a user to specifically define location in the most accurate manner possible for the plurality of users, applications, and service providers that use location interactively, computer technology in the navigation experience, location inventory management, and many other associated technologies can never efficiently be brought to the level of granular detail and efficient accuracy that is actually possible on these devices. The method described herein is a single user focused experience solution that focuses specifically on refining the specific and intimate human interpretive definition of location as intended by its user of the location combined with the latitude/longitude coordinate digital depiction of a geographic location for use on their device or any computer regardless of how any other user may have defined the exact same location, by definition is a dramatic advancement of the capabilities of current technology that creates a highly useful, concrete, and tangible result for the use of the method and API described herein.

We routinely take the separate steps that make up the collectively interactive computer driven data experience described in this method of using this type of data as an assemblage, and in every instance outperformed what is capable currently with even the best personal navigation equipment with the most current computer technology. By providing the herein described method of collectively applying these separate operations of manually selecting a visually verifiable geographic location from a satellite image and creating a detailed definition of these locations into one consolidated application experience, a highly efficient method is created that positively influences the actionable accuracy in the personal navigation experience for any user of the herein described method.

The method described herein provide a unique solution to this highly critical disconnect between the user of the mobile GPS and AGPS enabled device and uses the most current methods in place in the computer driven navigation experience to assist in a more accurate and efficient user experience with these devices and their computer driven systems. This method will also allow device and application developers to develop methods to engage with the described method and its user defined location identities to create a far more efficient and effectively intimate experience using the computer driven GPS and AGPS enabled mobile devices.

Figure 2:
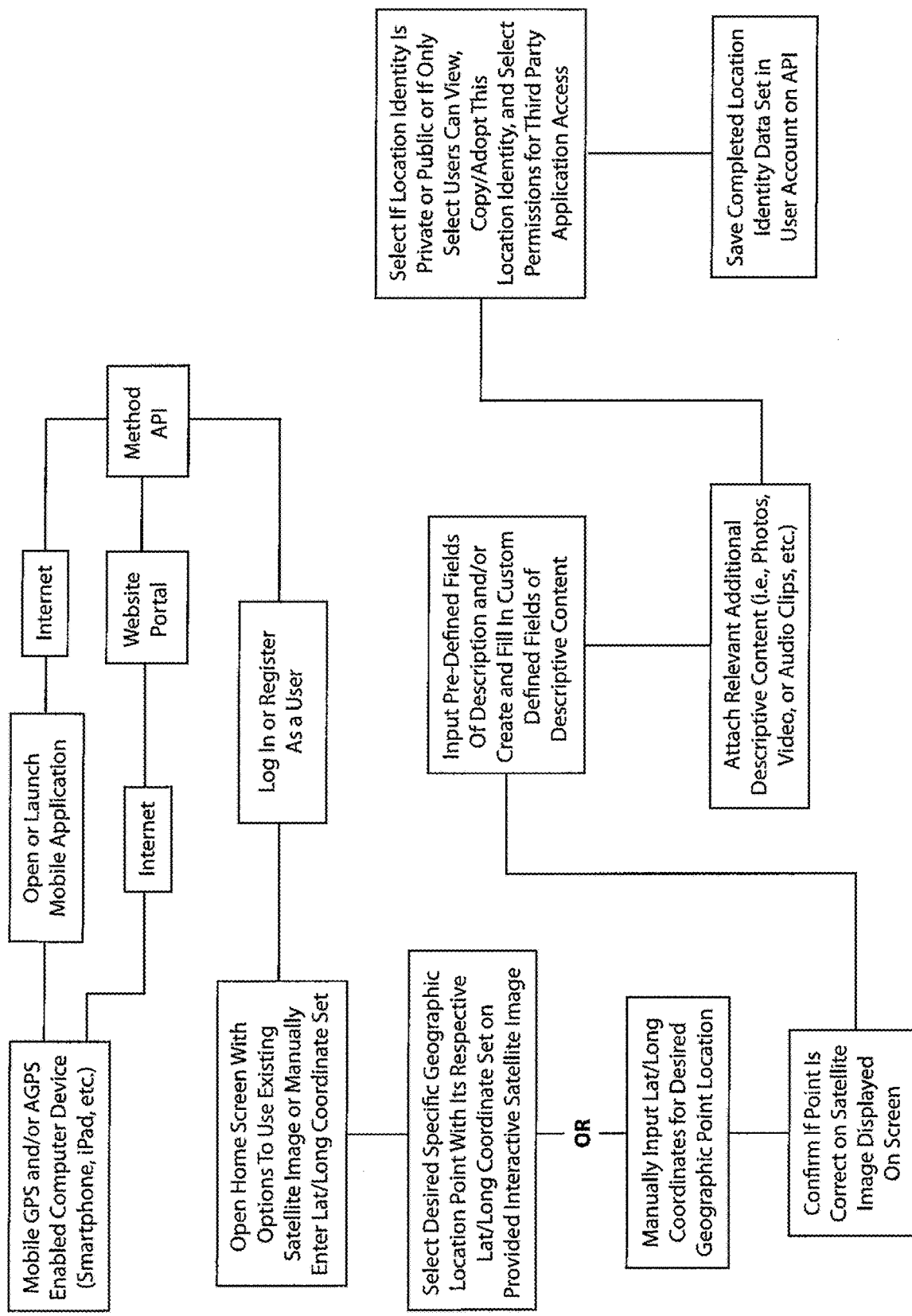
FIG. 2 depicts a flowchart of creating and saving/storing a user defined geographic location identity using a mobile computer device in accordance with one aspect of the present invention.
Figure 3:
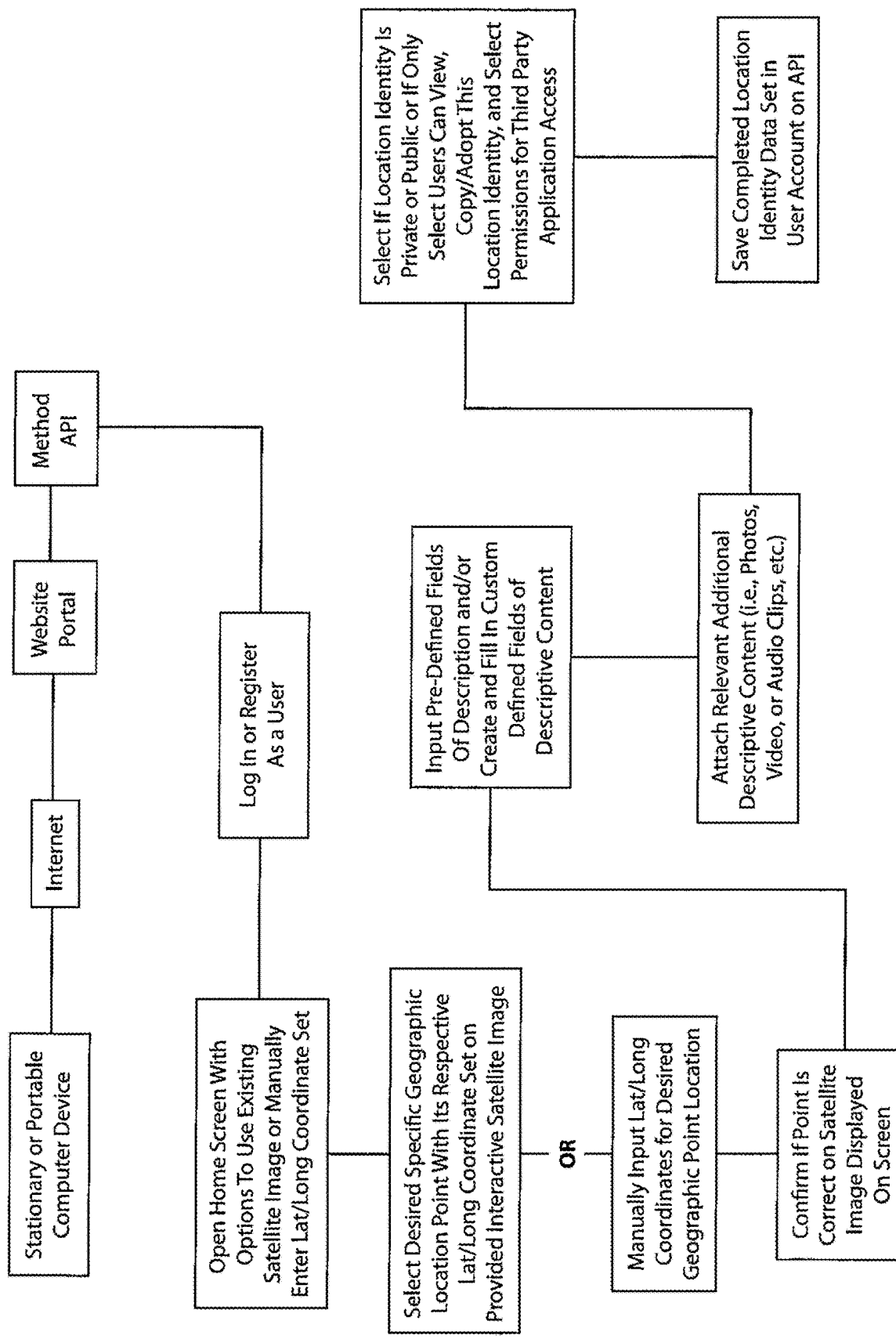
FIG. 3 depicts a flowchart of creating and saving/storing a user defined geographic location identity using a stationary or portable computer device in accordance with one aspect of the present invention.

By using the method and API described herein and as illustrated in FIGS. 2 and 3, the user can:

1) Open and install the API for use on a computer driven mobile device with the ability to connect with the Internet, or, go to a dedicated website from a stationary or mobile computer to establish a unique and personal user account and profile in which the user will store all of their individual specifically defined geographic location identities, or, log in to their existing account.

2) Open a satellite image on their device that is connected to the described system and select a point on that image to acquire its specific latitude and longitude coordinate set, or, alternately, manually fill in the proper coordinate set in the appropriate fields of entry to identify a particular geographical point.

3) Include a personalized description of any intended scope of use or interaction, and/or any individual item and its physical attributes while the item is present on that specific geographic location. This personalized description may include pre-defined fields of description and may also include the ability to create custom defined fields of description relevant to that user's needs in defining the particular and specific location.

4) Add pictures to the composed descriptive file or data set.

5) Add an audio and/or video clip with further vocally descriptive or interactive instructions relevant to the specific location and the intended interaction thereof.

6) Establish, by selection options, if the particular location identity is private, public, or only accessible by specified other users as well as specific programs or applications that are designated by the user as allowed to access the particular created location identity within the users established account.

7) Designate if the location identity is permanent or temporary in nature and establish specific dates and times in which the location identity is to remain active in its scope of purpose by those users or programs and applications that have been granted access to the specific location identity.

8) Grant established permissions to allow other approved users or computer applications to access and use the location identity and all its descriptive information for relevant use of the accessing user, computer program or application to copy and adopt the original registered users specifically and personally defined geographic location identity and then personalize the specific locations identity information to reflect the adopter's user defined needs and descriptions or modifications.

9) Save and store this collective user defined geographic location identity information in the user's personal account on the system as a data set, or established file type that consists of specifically a coordinate set of latitude and longitude and all associated user defined location identity information.

Figure 4:
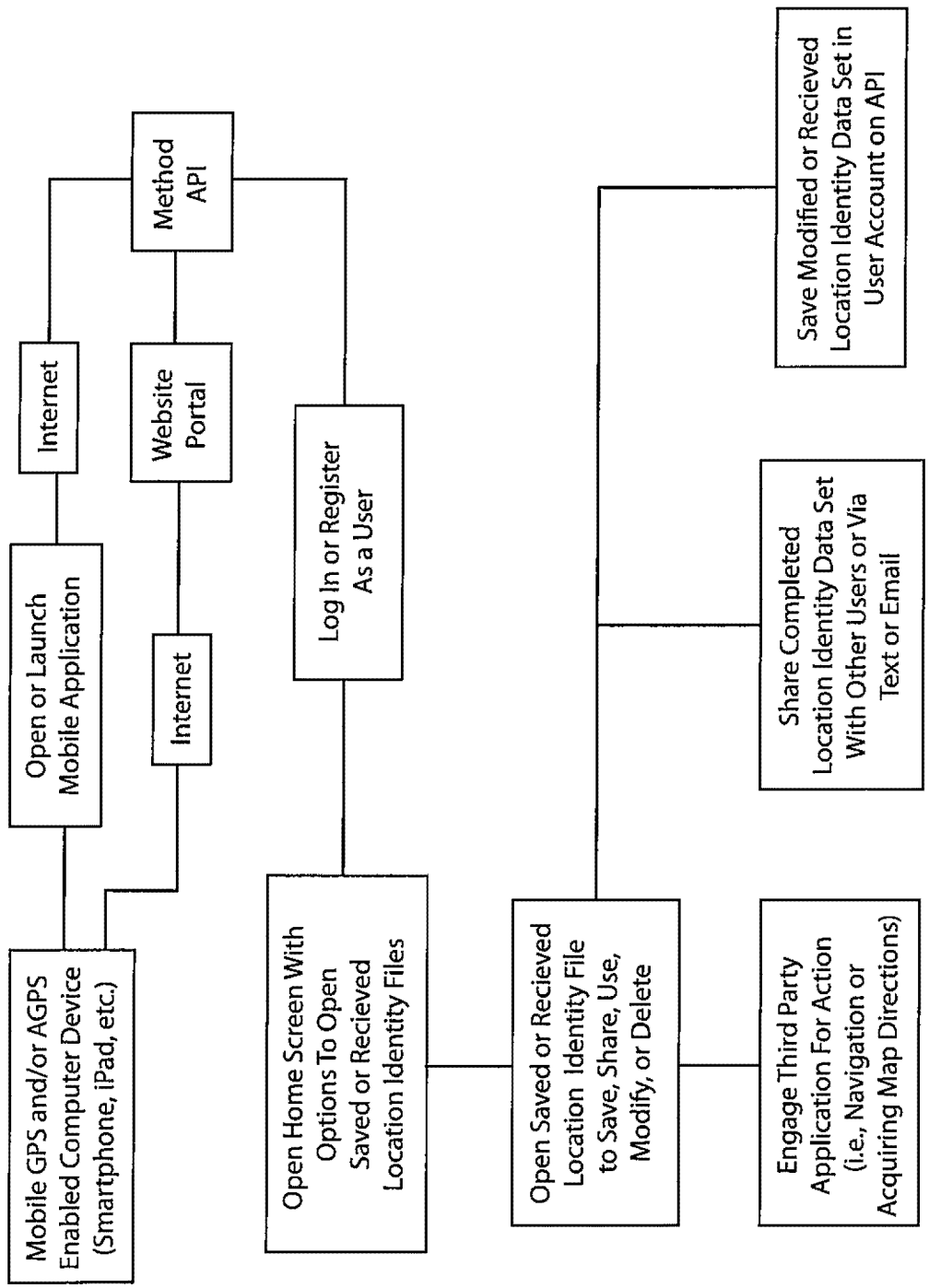
FIG. 4 depicts a flowchart of using, sharing, modifying, and storing a user defined geographic location identity using a mobile computer device in accordance with one aspect of the present invention.
Figure 5:
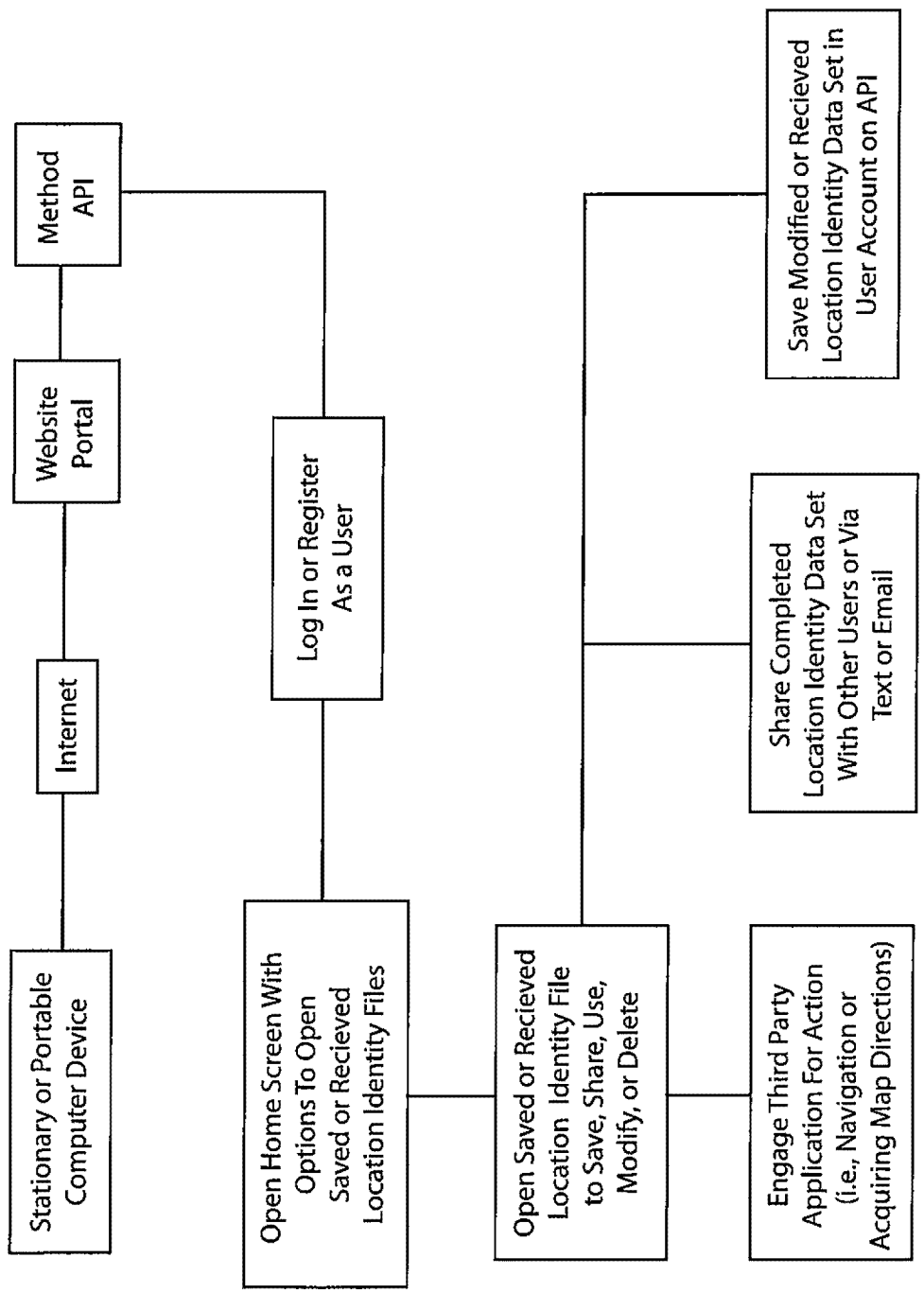
FIG. 5 depicts a flowchart of using, sharing, modifying, and storing a user defined geographic location identity using a stationary or portable computer device in accordance with one aspect of the claimed invention.

Thereafter, and as illustrated in FIGS. 4 and 5, this specific location identity data set or file may be retrieved for the user's purpose of any personal need to:

a) use this location identity, b) modifying the contents of the file by adding or deleting information relevant to this location identity, c) share this completed data set composed of the specific latitude and longitude coordinate set and all of its comprised descriptive user defining information and data with other users, or d) have it present in the users account for the purposes of allowing with the previously granted permissions, accepted programs or applications to access this particular saved location identity for relevant use of the accessing program or application.

10) Upon opening any particular location identity, the user can initiate their chosen default third party navigation application to in turn navigate to this particular location, although the method does not provide any specific methods of navigation to any of these location identities in the preferred embodiment.

A registered user on the method and system described herein can open and modify any of their own stored location identities. A registered user on this system can create a copy of any particular location identity information and reassign it to reflect a new, different, and unique stationary set of coordinates of latitude and longitude.

Importantly, the user of this system does not exclusively have to use an interactive satellite image or map to produce a user defined geographic location identity file. The user can also open up a blank location identity file on this system with fields of entry to create a unique user defined location identity file and manually fill in the proper latitude and longitude coordinate set along with filling out the requisite location identity information, visually verify and confirm the location on the device display, and store that file on the system in their data storage user profile located on the herein described method API.

In the preferred embodiment, the GEOLOID comprises a complete and functional user-defined geographic location identity file or data packet that can be saved by a registered user on the system.

The GEOLOID must be comprised of:
a) a latitude and longitude coordinate set, and
b) any combined plurality of descriptive attributes of that particular location or item that is placed at that specific location the user deems fit to define that location for their own specific use or interaction requirements which can include text, picture attachments, video attachments, and audio attachments.

In an alternate embodiment, the herein described method would easily facilitate the possibility of using an alternate defining system of creating a computer operable and readable digital depiction of a geographic location point that can be either converted from a latitude and longitude coordinate set or becomes immediately available by the user in selecting a geographic location point from the satellite or map image displayed on the users mobile device or stationary computer device. In the alternate embodiment the herein described method would have present in the processing of the digital representation method of the geographic point, a conversion processing method embedded in the primary method to convert the alternate digital depiction of the geographic point to a latitude and longitude coordinate set, or, have the ability to provide the alternate digital depiction of the geographic point as a computer readable file to the operating system of the user device to process the task of displaying the digital depiction of the geographic point represented on a satellite or map image shown on the display of the user device.

The default standardized coordinate type that is used in a completed GEOLOID file or data set is the digital decimal format and in the preferred embodiment any alternate coordinate set format that represents the manually selected or directly input geographic location point will be converted to a digital decimal representation of latitude and longitude format. When selecting a point on a satellite image, the coordinates will appear in the digital decimal format. If manually typing in the coordinates into the supplied latitude/longitude fields in a format other than the digital decimal degrees format, upon confirming the input of these coordinates, they will automatically be converted to a digital decimal coordinate set unless otherwise directed by the user preference. But again, the default latitude/longitude coordinate format for the herein described method is digital decimal degrees. These GEOLOID files can be permanent or temporary in nature and can have future dates and times of activation or deactivation as associated to the descriptive attributes as defined by the user, and can also have expiration/automatic deletion dates of relevance as defined by the user.

Thus, the GEOLOID includes a digitally representative code or coordinate set that defines the specific point on a computer readable map or satellite image set as a latitude and longitude coordinate set. A complete GEOLOID data set includes the latitude and longitude coordinate set for the specific geographic point that represents the user selected location and its descriptive content that has been established to accurately define the location by the user for its intended purpose. All GEOLOID data sets are anchored to the user that constructed it and are not assumed to be the definitive digital definition of any singular and exclusive geographic location unless specifically associated to a specific method user and being used within their own user account.

As can be seen, any one specific geographic location with a similar geographically designating latitude/longitude coordinate set can have an unlimited number of GEOLOID descriptive identities assigned to it. The only element that sets them apart as individualized files is the extension of the completed file name and file storage location on the method API connected to each individual user and their unique user account designation that is represented in the file name associated to any singular GEOLOID file.

In an alternate embodiment, if the location identity is associated with an item, and not the physical land on which the location is determined by its originating GEOLOID file or data set established by the registered user, the location identity's latitude and longitude coordinate set can be deemed "In Transit" by either the registered user, or, by any third party program or application licensed with approved access by the system described herein and by the user with provided permission, with the third party applications capability to track an item using their own established methods, to track the position of the specified item. The system and method described herein do not perform GPS or AGPS enabled active tracking of any registered users or any of their respective location identities stored on the system using this method. Because the herein described method does not track any specific established GEOLOID, by signifying that a specific GEOLOID is "In Transit," it is the responsibility of the user or the third party application to represent the most accurately current position of any GEOLOID file that is deemed "In Transit."

This method of establishment, storage, and interactive distribution on the Internet of only the description of any particular users descriptive definition of proposed interaction with, or specific description of any physical items on or around the specifically selected geographic point location, is not designed to imply specific physical land ownership of that particular point, but can be used by the physical land owner to state in the descriptive categories within the location identity the nature of the ownership structure of the physical land or item described located at that specific point. This method of commerce on the Internet does not include, nor is it designed or intended to perform, any sort of navigation to and from any of the defined location identities residing either on or outside of this storage system. It does not perform any sort of tracking functions of the users on or outside of this storage system. Nor does it provide any sort of route mapping or geofencing in any form with a plurality of connected points by any one user. This method is designed to allow a registered user of this method the ability to compose a data packet/set by selecting a highly specific singular point on the satellite image or map displayed on the screen of a computer device that is GPS enabled and/or capable of obtaining accurately the specific selected locations convergent point coordinates of latitude and longitude and combine these numerical coordinates with any registered or licensed users unique descriptive identity for that location, with the ability to perform this task on many individually selected point locations, and create a plurality of unique singular location identities that are stored in a user account within the systems registered user storage framework for future use purposes at their discretion.

Because the herein described method is designed to create an engagement experience designed specifically to the individual user, it focuses the content to be displayed in a more user specific way geared toward the individual users own use requirements. Within one corporate campus that uses the same street address, there can be literally hundreds or thousands of different location identities within the boundaries of that street address. When you combine the fact that users that work within the confines of that campus can have their own personal interpretive definitions of locations particular to their interests, the potential location identities that can be present at that one street address can be pushed to tens of thousands of location identities established in one street address alone. Every door, window, parking space, tree, garden, vehicular entry way, delivery spot, and any number of other interactive events that can be described by its location within that address can have its own location identity. To establish specific accuracy of a geographic point, there is no more accurate representation of that geographic point when defining it for use on location aware computer driven GPS navigation than the latitude and longitude coordinate set. This method is designed for use by any particular user on a mobile or stationary computer device capable of connecting to the Internet to access their user account on our systems API and create a user defined location identity file by selecting a point on a satellite image and automatically generating a latitude and longitude coordinate set or by filling out the desired latitude and longitude coordinate set manually in the supplied data entry fields presented within the operation of either the mobile device application or website portal. Alternatively, this method can be used by accessing a satellite image through their computer designed with the capabilities of operating and interacting with geographic satellite imagery which is supplied through our system with their user account by either a third party with approved licensing by us or by our own obtained and supplied licensed satellite imagery, to:

1) choose a specific location point on a desired geographic satellite image and obtain its associated specific latitude and longitude coordinate set, 2) fill in the appropriate supplied fields of information as well as custom definable fields of descriptions to define that geographic location with the user's own unique descriptive identity information, and 3) save and store that information in their own user profile/account on the respective electronic computer based storage system on the particular API (Application Programming Interface) storage device which resides in a location that is connected to the Internet for electronic access by its users through the use of either a stationary or portable computer device with the capability of accessing the Internet, a mobile computer device such as a smartphone or GPS navigation unit that has the capability of accessing the Internet, or any mobile device that is GPS enabled to perform the requisite task of interacting with supplied digital satellite or map imagery that may or may not be connected to the Internet to perform the aforementioned task of interacting with a supplied user defined location identity with its particular and specific geographic location at the supplied latitude and longitude convergent point.

The user can in turn save this detailed geographic location identity information in their personal user account for use of retrieval in the future, share this user defined location identity with other users or licensed applications, make the location identity information private for their own use, or make it available for public access to those deemed approved by the user to access that particular locations specific personalized identity information by choosing the requisite permissions the user assigns to that particular user defined location identity. Through proper licensing approval or approval given by the user, third party products, programs, and applications can be given access to this users', or other user's providing proper permissions, location identity information through this system and method.

This is not a system that performs navigation or tracking, or, route mapping or geofencing operations consisting of a plurality of geographical point coordinates of latitude and longitude. This system and method is solely and specifically designed for the purpose of creating a user unique defined identity to any particular specific geographic location point for storing, sharing, or providing access to the particular users unique detailed geographic location information of any specific geographic location as defined by the user on this system as their own personal inventory of location identities in their user profile using this specific user defined geographic location identity storage, sharing, and distribution method. In brief, this is a simplified method of storing specific geographic user defined location descriptive identities for the personal use of the specific user and not broadcast locations unless specifically desired to be so by the user. No tracking, navigation, or route mapping of any sort is a part of this method and system.

The coordinate points of latitude and longitude have been considered to be theoretical in nature. In systems where they are included as a tangible physically defined location, or defining an item sitting at or on a particular physical location as an exclusively patentable set or system of coordinates this consideration is understandable given the infinite nature of exactly how defining infinite the coordinate point can become when refining it down to the smallest finite point such as the head of a pin.

However, these coordinate sets as considered as closely specific in proximity as a human perceptible location and as a required component of a specific method of constructing a user defined geographical location identity that is comprised of these coordinate sets and all of the defining characteristics of any given location relevant to the users interaction with that specific location, they become an extremely powerful tool to create a highly useful, concrete, and tangible result with far more specific accuracy than presently available technology that does not use these coordinates in the same arrangement as the method described herein, especially when used in combination with current technology as well as providing broad expansion and inspiration to new and novel technologies to refine the accuracy and efficiency in the computer and computer driven mobile device user experience not possible without the presence of this specific combined element commodity in use on these devices.

The development of the GPS (Global Positioning System) and AGPS (Assisted Global Positioning System) as used on personal mobile navigation devices are driven specifically by these latitude and longitude coordinate sets and are a required element for these mobile devices to operate effectively or to effectively obtain a latitude and longitude coordinate set from a satellite image displayed on a computer screen.

Similar to the assemblage of the construction of a particularly and uniquely designed file type, having a data set or file type that is designed to be complete only when it includes the coordinate sets of a specific point of latitude and longitude combined with the specific user definition of that particular point as a singular location identity file is a novel concept as the coordinates are a required part of the assemblage in order for it to effectively perform on a GPS or AGPS enabled device.

The present invention relates to a method of assembling the selected or designated coordinate set points and coordinating the set points with their specifically defined attributes of that particular location and related directly to a registered user of the method described herein by file name extension for their specific purposes of use or physical description or both and the user of the presented invention is now able to store that data file as their own personal commodity on the API described herein and accessed on the Internet to share or distribute that data file at their discretion for their own specific uses or needs, absent of any other methods that involve geofencing of a plurality of coordinate points, geotagging (which produces a geotag to the users current device location) with a text, photograph, or social interactive experience, navigation, tracking, or any other methods besides developing, storing, sharing, or allowing access to specifically crafted user defined geographic location identities that are complete and can be displayed on a satellite image or map only if they have associated latitude and longitude coordinate set attached or filled out in the file or data set. By having the file extension directly related to the specific and individual user, the same identical location can be given a separate location identity for a separate and distinct purpose of use by a different user of the herein described method.

As a description of advancement of the current methods, the method described herein is as important to computer driven systems that interact with location aware technology as the street addresses and zip codes have been to the development of the current system of computer driven land navigations for vehicles in use today. Computer technology in general needs to have a more detailed and specific method of defining location and its personal needs for the user interacting with that specific point that is far more refined in specific definition than the street address. As well, the computer technology needs to be capable of a less cumbersome approach than having to gather all of the relevant data that comprises the users definitions and intentions with the location and having to then rebuild it all over again because the point is far more refined than just the street address alone and what a computer search can currently gather relevant to the detailed information that may be required by the user for any specific location.

The advances in both stationary and mobile computer technology to provide the platform of highly intimate interaction with the physical landscape has created this need for a unified solution relevant to the specifics of "location" and its limitless interpretations beyond the physical address location. Personal navigation relevant to the specific nature of the activities of individuals has once again created the need for a more granular and intimate way of interacting with location in general.

The capability of these mobile devices to improve productivity in the personal user experience is absolutely staggering. One primary reason for this low advancement rate in concretely productive activities using these GPS or AGPS enabled devices, outside of simple and generalized navigation or means and methods of tracking either items or persons, is the lack of a method to effectively tie together, personally selected and intentionally specific locations and their respective highly specific latitude and longitude coordinate point sets, with the specific human descriptive attributes of both the physical design and/or intended purpose of use or activity for which the user interacts with these specific locations in a truly unified method.

This associative interaction is performed billions of times a day across the globe for both consumer and commercial use in the form of any sort of verbal directives, written notes relevant to the interaction or association to the specified location, informational searches on the Internet to discover relevant information to gather about a particular location, or a combination of any of the aforementioned efforts and then using the combination to navigate to the that location and interact with it. In short, there is a need for a simplified, definitive, and efficient way to digitally personalize the identity of location so that computer driven devices can use the information in way that also creates a more granular and specific user experience of interacting with location(s). There is also a need for a method that makes use of the high rate of personalization to advance a more productive experience for the user of these highly capable devices as a tool of efficiency through specifically accurate engagement of use as it relates to location as a general term and its infinite interpretations of use and description.

As described herein, the experience of interaction with location as a generalized term is actually highly unique and personalized and there is no centralized data storage system and supplied method accessible by users that is specifically and exclusively dedicated to user defined geographic location identity storage and distribution, for these locations identities exclusively, as a purpose driven unified commodity as a source of computer driven interactive commerce on the internet. In short, there is no data storage on the Internet that provides an API that is exclusively dedicated to user defined geographic location identity and these location identities exclusively as a method of commerce. There is a multitude of satellite navigation and route mapping methods available with location input and storage of location information methods buried within the confines of their social interaction, route mapping, geofencing, gaming, tracking, and navigation platforms and methods. However, there are none as a platform and method dedicated to a unified singular access point of storage and distribution of singular and specific user defined geographic location point identities only as a single stream commodity for interactive Internet commerce with no other associated methods of navigation, route mapping, tracking, or other means and methods associated to the method of commerce on the Internet as their business model. These identities are not predicted, generated algorithmically, or assembled by methods that gather information relative to a particular location to form a data set of information to establish an identity to the location.

On the other hand, the method described herein requires the specific input of a registered user or application that the user has procured capable of filing in the required information that defines a complete file or data set of the invention that consists of a coordinate set of latitude and longitude convergent point coordinates and its associated user descriptive information of that locations physical attributes or scope of use.

It is because of the absence of this method of creating a unified and essentially standardized digital definition of the human description and interpretation of a location and its attributes being readily accessible online on the Internet that we have quite literally hit a proverbial wall in taking advantage of how incredibly accurate, highly specific, purely intimate, and soaringly efficient the personal navigation experience can truly become in developing these simply genius devices into highly productive tools in our digital computer interaction with the physical world. We envision a technologically advanced reality termed "The Internet of Things" where all computer driven devices are actually connected though the Internet to combine into entirely connected experience from one device to the other regardless of the specifically required need or engagement experience. This can actually become a reality more quickly than current technology permits and it is our belief that our invention of the method described herein will be the definitive catalyst for this rapid expansion of a more highly detailed interaction between the human/digital device experience by creating a definitive digital commodity that will actually drive this rapid advancement opportunity.

For computer technology to "learn" more of the human definitions associated with the physical world through actual human definitions and interpretations to create a smarter and more "human like thinking" computer, there needs to be a more effective vehicle for these computer devices to understand how humans define just about anything. The one universally concrete element in common between the human user and the computer driven world that is specifically relatable between that which humans can place a definition on, of either an object or an experience is its location, in which the computer defines it with a coordinate set of latitude and longitude. This one specific union of user definition placed on the specifically identified coordinate point of latitude and longitude by the computer is the single most important connection association that is directly operable on a location aware device that will influence and produce a more granular and intimate user experience and produce far smarter computers moving into the future. This human defined location identity could be the center point or immediate proximity of anything from a light post, mailbox, or a driveway entrance, to the place where an auto accident has occurred, where a taxi driver needs to be to pick up a client, where a garbage dumpster is placed, or the position of a sprinkler head on a golf course. Within that definition can be, for example, the brand of light post and the type of bulb it uses, the size or dimensions of the particular mailbox, the description of the driveway entrance that it is for vehicles of up to a certain height only or that it is the entrance for customers only and not deliveries, or how much luggage the taxi client will be bringing with them when they get picked up, how that dumpster needs to be positioned, or the exact times that sprinkler head turns on to water that part of the golf course so that golfers know and don't get soaked when the sprinkler turns on if a program or application on the golfers mobile device that provides proximity detection methods has a license to access the golf courses publicly accessible location identities on the system of user accounts with the requisite permissions.

A GPS or AGPS enabled computer can absolutely understand the exact locations where all of these items are or occurrences have taken place and in some cases can even pick out the detailed outlines of all of the objects at these locations. However, they have a highly limited capacity to define the specific items they are "seeing" or without human description cannot know the specific nature of an accidental or a required or requested engagement that has either happened, is currently happening, or needs to happen at that specific location unless it is identifying/predicting occurrences or objects that the computer has been programmed specifically to identify or predict. The computer cannot "think" and describe in human terms unless it has been designed to learn the human descriptives of more highly specific items, objects, and occurrences.

But more directly and immediately present in our current system is the major inaccuracies and inefficiencies that are present in the current format and methods of how we interact with the devices that comprise the GPS. "You have arrived at your destination," as announced by the GPS enabled mobile device, is not always an accurate statement. We are relying on the development of technology alone to solve these inaccurate and inefficient occurrences such as the user of a GPS navigation device going to a particular address and ending up next to a vacant lot or on the wrong side of a building on a one way street, thus having to now turn to more personally informative methods such as either making a phone call and getting more specific direction or driving around scanning the area for the location they are trying to get to.

Cumbersome methods have been introduced to try and help the user correct the problem, but again the sheer magnitude of failed occurrences has corrections oftentimes taking months, years, or never happening at all when it comes to corrections. There is also the issue of timely updates to routes or locations that have been altered or modified. Users of these navigation devices have to wait for the mapping and navigation companies to update this change that can have people navigating to somewhere that may not even exist anymore or encounter a route that has been dramatically altered or is temporarily non accessible. There is also the common occurrence of both roads that have been submitted for mapping that don't actually exist as of yet and routes that have closed but are still a part of the navigation system. Anyone that has used one of these navigation devices has run into any number of similar scenarios a number of times. It is the inherent nature of the GPS navigation system to have these inefficiencies because the detailed real life scenarios of location instances simply cannot be handled by the tech companies alone. What is missing, is the ability to take the defining description of location and handing it over to the users and entities that are interacting with each other to create a more specifically defined identity to these locations they are most familiar with and be able to provide real time definition to the rapidly changing landscape in a fluid fashion. The method described herein provides this.

All of the mapping and navigation providers have extremely powerful technology that can get us very, very close. But there is no more accurate definition of any particular location than the definition and description given by those most intimately familiar with these specific locations. While navigation companies may be able to give you the address to a house quite accurately and even give you a picture of that house, they cannot tell you, without any prior knowledge, exactly the area of the house where the filler pipe is located for home fuel oil delivery or where in the yard the sewer pipe clean-out access is in the lawn under the surface at that particular address.

Using the method and system described herein, the home owner or the fuel delivery person can zoom in on a satellite image of the house and directly indicate the location of the fuel oil filler cap. Thus, what has been needed and what has been missing to date is a more specifically defining method that can not only raise the efficiency of current systems, but also be usefully and concretely adaptable to future iterations of GPS technology and can grow the efficiency of the GPS and all of its tremendous capabilities for the user.

Computers are capable of learning at an impressive rate. However, without specific human definitions of specific items and location characteristics along with the multitude of subtle nuances that form a human interpretation of description, a computer can only go so far at this point in time in understanding the granular accuracy of any given object or purpose of the location in which it resides. With the method described herein, there is a specifically defined object or engagement intention that is specifically defined by the user for that particular experience and not just a pinned location on a map. It brings the identity of location down to its specific point and defining characteristics both physical and intentional and becomes specifically interactive with the user. Establishing this commodity for users and other programs and application to access with requisite permissions creates a very tangible and easily identifiable increase in the use of current methods of navigation for not only accuracy and efficiency, but offers a useful tool for commercial entities and municipalities to create inventories of relevant objects and/or services related to location in a fashion more reflective of how we actually interact with location outside of the simple street address system that has been in place for many decades and will in fact probably never cease to exist because of the ownership aspect of the term "location". This method addresses the interactive aspect of what location means as applied to the interactive definition of location, not specific ownership. As an example, a particular street address of a university campus could have literally thousands of specific location identities with use case interactions that would be relevant to thousands of users every single day.

When it comes to navigation, we have become extremely efficient at getting very close. There is truly only one solution to resolve the achievement of a more highly specific and more highly detailed experience in not only navigation activity, but also open the flood gates of influence to technology in many different fields and truly create a fantastic next level of dramatic advancements in fields ranging from not only personal navigation and extreme advancements in vehicle and drone delivery systems. This system can also develop into an extraordinarily efficient and unified inventory system for municipalities and utility companies that simply does not currently exist given the limitations on current technology. In fact, once fully implemented and populated through the Internet, this solution method and its attributes can have a profound effect on digital computer recognition algorithms on an epic scale moving into the future.

This theoretical entity of the convergent point of latitude and longitude by rights of how it is transformed into a specifically defined data set, stored and distributed on actively physical computer systems that performs GPS or AGPS enabled tasks, can be transformed into a commodity that performs a tangible increase in the detailed accuracy and efficient usability by its conversion to ownership of a usable descriptive identity by its defining user instead of just a predefined point with no associated personally relevant definitions or descriptions relevant to that users personal interactive needs. As described herein, the user defined geographic location identity is contained in a data packet compilation or file type created by an individual user to define in their own unique descriptive identity of that particular location for their own purpose of storing, retrieving, or sharing this personally established location identity data set.

The convergent point of any line of latitude and any line of longitude is now, in the age of GPS enabled computer systems and devices, a required data set of coordinates in order to enact an action or create a visibly relevant identity of an accurate location on a computer driven system to be displayed on a GPS enabled interactive screen or used to guide a GPS driven operation. Once these points are defined by the user, that user defined location identity point and its associated set of latitude and longitude coordinates, as a physically relevant or purpose driven identity, becomes a commodity that can be stored for future use on any given computer driven device that accepts its particular data set that includes the coordinates of latitude and longitude.

The fact that these physical computerized GPS enabled devices are literally driven by these coordinate sets to generate a tangible outcome for a particular user in reality defines the fact that once identified with a user defined identity associated to that convergent point of latitude and longitude, it becomes a commodity capable of initiating action as defined location identities that can be physically interacted with to create a relevant physical location composition of attributes or define a necessary physical action to be performed at that location by either human or by machine as directed by a physical computer driven system.

User defined location identity has been buried within mapping and navigation programs and applications in very basic and cumbersome formats exclusive of each other which, if not in cooperation and in synch with one another for purposes of either competitive isolation or the systems, do not properly communicate with each other, this can create many different experience inaccuracies for the exact same location.

Additionally, if a user, such as a company with many locations, wants to have this sort of location information consistent across all navigation systems for access by customers and clients, vendors, or service providers, they often need to input this data numerous times on each different system. If there are changes to any one location relevant to its physical and geographical design or attributes, there is no pure and unified method of communicating these changes to all of these different navigation or search engines to have those changes immediately communicated in an effective and efficient manner.

It would be beneficial for location, and its human defined identity, to become a separate commodity outside of just being a description of an address and some notes buried into the platform of an application. The specific definition of the particular location and the users defined purpose of their interaction with it must be a data packet of its own user defined content exclusive of any tracking or navigation experience first before plugged into any interactive experience simply for the fact that all users of any relevant identical location do not necessarily interact with any one specific location as the same experience. Physical ownership of a spot on planet earth does not always coincide with the experience that location is being used for by many different users. Location interaction is in reality is a user defined experience. What matters in the actual performance of the navigation experience on current computerized technology is the coordinate set associated with any specific location. The main problem is that the identity of location has been limited to the parameters of the predefined descriptive fields that have been placed to describe the default general locale such as the mailing address.

The ISO Standards for Location Description (hereinafter "ISO Standards"), as established by ISO/TC 211 addresses geographical description and identifiers standards. The ISO Standards address what navigation, mapping, cartography, geospatial, and a number of other geo-defining method software and systems should be using in regards to defining geographical locations, the communication of the design of objects (such as buildings or features) and how they are represented, how they change and how they should morph into other computerized language as it relates to definitions predefined and standardized with lists that grow, based on suggested descriptives of what is to be used for seemingly endless menu options or language for programs or applications as a unified standard, as well as what sort of representations should be made for any number of mapping and geospatial identifiers both digital and flat paper representations.

There is a need for a unified communication between computer-driven systems that communicate with each other and the identity of geographic location. In addition, there is a need for a unified standard for the technology industry with respect to location and all of its possible digitally represented forms for human interpretation with the addition of specified human descriptors of a specific design and intention.

One thing these ISO Standards do not address is the infinite nature of defining terminology that individual users of these mobile navigation devices will put as uniquely personal definitions on just about anything that can be named as a location. For example, to standardize the language of the interpretive definitions of the same coordinate point of a mall entrance being used by thousands of different users for any number of reasons as a whole is simply impossible.

What these ISO Standards do in fact provide is that when users define location in more personalized terms with the flexibility of human interpretation, there will be a crossover opportunity for technology to more fluidly provide a midpoint interpretive format by creating recognition software that dramatically expands the capabilities of computers to think in more human defining terms through associative processing. Thus, while the ISO Standards may be a solution for technology industry communication within the basic and detailed platforms of geographic character display and interactions within systems, "user" defined geographic location identity is very different from a standardized method of communication in computer driven geographic interpretive systems.

What the present method accomplishes, by creating a user-defined singular data set for the user to compose specifically that is comprised of a latitude and longitude coordinate set and the descriptive characteristics as defined by the user personally, in human terms of their own design, and providing this singular and efficient method for storing, sharing, and providing access to these stored data sets interactively as a sole method of commerce on the Internet, is a specific yet flexible and immediately useful method for the user in creating an interactive and unified method at the user level of geographically relevant interaction with computer driven mobile devices, desk top and laptop computer devices. There is currently no singular API available that provides this method specifically as a stand-alone method of storing user interactive geographically relevant data as user defined geographic location identities.

Although ISO Standardization is an important consideration when constructing methods within a computer application and system designs that drive the physical mechanisms of the entirety of the GPS, AGPS, and all of its relevant operative capabilities, it has no correlation to user-specific definitions in the user experience outside of the latitude/longitude coordinate sets. The assembled and attached descriptive values in the method described herein constitute a completed file or data set on the API are specific to the human user and their uniquely personal descriptives.

The method described herein uses a digital decimal degrees format for latitude and longitude coordinates, which is believed to be an efficient and accurate standard of location proximity recognition. The digital decimal format is one of the simplest and most easily remembered form of a coordinate set of latitude and longitude for most common and casual users of computer driven systems that provides a specifically accurate marker for any specific location and is most readily available for use on current systems for a highly accurate interactive user experience using mobile GPS and AGPS enabled devices as well as stationary computer devices connected to the Internet. The digital decimal format is also the most obviously versatile platform for use as technology advances to refine the accurate detail that is viewable on these devices at any one particular location point identified by the user.

For the purpose of specific location selection in the method described herein, the decimal degrees format is used as the format for files to be converted, upon entry of the confirmation of displayed point accuracy on a satellite image. The decimal degrees format is formatted as a multiple decimal place containing at least 2 decimal places, at least 3 decimal places, at least 4 decimal places, at least 5 decimal places, at least 6 decimal places, at least 7 decimal places, at least 8 decimal places, at least 9 decimal places or at least 10 decimal plates. Preferably the decimal degrees format contains 5 or 6 decimal places, which allows a user to define locations to within inches upon selecting a location on a provided satellite image. If desired, a user can reject the conversion and specify a longer or shorter decimal representation for their use in the coordinate set. which location identities are located geographically.

Similar to the way zip codes, telephone number prefixes, and country codes provide a readily identifiable proximity to location, a generally accepted use of decimal degrees in latitude/longitude coordinate sets will provide a general understanding of the approximate location one is describing for users of this method. As described herein, the system of street addresses and building/house numbering will never become a thing of the past as a result of advancing technology. However, with the advent of a more refined user experience, driven by advancing computer technology that moves beyond the generalized understanding of location and all of its possibilities, geographic coordinate sets make for a useful next step in defining specific location values and descriptive context for the users of the computer driven mobile devices.

The method of geotagging is an associative occurrence that is provided as a process within a program or software to provide the defining of the present geographical position of which a photograph taken, of where a user was when a text was initiated with possible descriptive value, where an event may be occurring, or where a user is currently when they logged into a particular application for allowing others to "see" them in relevant applications using the particular application. These geotags are then stored on various API's connected to the Internet to then become searchable public content on a web browser to gather content specific to either, a specific geographic area, or, a defined proximity.

Geotagging is most commonly associated with the geotagging of photos in which the geotag is marked by the user. There are methods currently being refined to be able to mathematically define each of the pixels in a photograph, in order to accurately place a GPS coordinate set on each pixel which in turn would provide a position of where the marker actually sits on a coordinate defined point. However, the process of geotagging happens at the point location of the activity where the device was sitting at the point of initiating the geotag. There are many different combined processes that can attach geographic meta data to the photo after the fact with meta data that is taken from a search of other relevant photos or activity that were geotagged at the same location. However, geotagging is inherently a user device present at location process or method.

In contrast, the present invention creates a user defined geographic location identity file or data set as a remote action separate from the method of geotagging. Although a geotagged image may become part of a user's specific location identity file, the meta data of latitude and longitude coordinates geotagged onto that photo does not influence or change the latitude/longitude coordinate set selected by the user to define the location identity being constructed. What this means is that if someone adds a picture of a fire hydrant that had been geotagged to a user-defined location identity file, that picture of the fire hydrant may be a part of the file as a descriptive reference to allow the user to indicate that the fire hydrant in the locate marked by the user looks like the one in the geotagged picture or is the same model with the same attached fixtures as the one in the geotagged picture. In reality, geotagging capable applications can benefit from the user-granted permission of access to a user's method file on the method API by providing the ability to display a marker on the screen that signifies the specific location of a particular subject being described in the location identity file being accessed.

The "What3Words" approach is a method that essentially attempts to rewrite the addressing system with a supplemented overlay of the coordinate system of latitude and longitude with a 3 foot by 3 foot grid, and that has a unique three word address for each 3 $ft^2$ that defines the address of each unique theoretical box on a given square. However, a 3 $ft^2$ could contain an obstacle that could completely change the scope of the experience required at any one particular location. For example, let's consider a one foot thick concrete wall. If that wall was extremely long and was placed centered on one of those 3 foot squares with one foot of space afforded on either side of that wall, it could dramatically alter the required navigation to get to an object that was described to be at this particular location.

The only way to determine and achieve the specific accuracy of location identity is to be able to present the most precise point location of latitude and longitude. Although the What3Words method creates a novel method of determining where a 3 $ft^2$ patch of land is located on the globe, it does not support the specific accuracy we are seeking to accomplish in the present invention. Additionally, the What3Words method will not support the granular and specific needs that are currently present and will be needed to support a truly intimate and specific user experience for not only human interaction but also automated device interaction such as drone delivery needing specific center points and surrounding measurement descriptives to make a clear and unobstructed landing.

The present method, within its detailed information within the user location identity file, can specify a descriptive circumference around a specifically selected center point location identity in any geometric shape required in the custom fields of descriptive entry within the design of the actual operable application for the presented method on the method API and stored within a particular location identity.

The Google Open Location Code system was designed to replace street addressing as a representation of location. However, this Code system is designed to represent an area, not a point, where the size of the area is variable.

In contrast, the method described herein relates to the objects or interactive intentions at the latitude/longitude coordinate set point specifically and how the user defines it specifically with the users own unique scope of purpose and uniquely relevant attributes. Even if the Google location addressing system was to be put in place to assign codes to relevant areas, places, or structures, there would still be points within that area for which the present method would still be highly relevant and exclusive in use, because this system is still an overlay on the conjugate graticule that is made up of the system of latitude and longitude lines covering the globe. We are selecting points from the first digital basal layer that overlays the satellite images users select from which is the latitude and longitude coordinate identifiers.

The Open Location Code method or system concerns blocks of land or full structures. It is an alternate addressing system to the street name and number system and is geared toward the back end developers to develop embedded places within Google Maps products. In contrast, the present invention is directed to specific points, not plots or places and can be, for example, the location identity given by property management of the particular lamp post that needs a light bulb replaced or a specific door entrance that needs a new door closer, or a user defining that same door as a location for a meeting point.

It is believed that one of the reasons that people do not use latitude and longitude coordinates as a regular practice is because the currently available means of using separate tasks of applying the system of latitude/longitude coordinates to user defining descriptions with multiple disjointed methods is cumbersome and lacks the true value of efficiency. In addition, and possibly even a larger deterrent to becoming more familiar with the use of latitude/longitude coordinates, is the many different formats of latitude/longitude coordinates and the actual characters needed to construct them.

The only current and widely recognized latitude/longitude coordinate set that can be typed out directly from the widely used QWERTY keyboard layout is the decimal degrees format. By using this particular format as the standardized choice in our file construction and display for point selected input, it is far easier to enter, recognize, and remember. If the point you would like to put a location identity on is a water based location, such as the tie up post of a boat dock, you might want to focus on remembering that particular point because you may be using the same spot over and over. You may provide land navigation to get to that location description first being the marina, and then second being this tie up location to get to your boat. Alternately, if the location identity you are describing is the dock at your lake house and you are having a party, you may wish to share your driveway location identity with your guests coming by car and your dock location identity with your guests coming by boat which can be easily accomplished using the method described herein.

If the point descriptive value is defined by the user as the center point of their driveway, the navigation experience of engaging that location is much more efficient using the specified information in a data file or data set of the present invention than if the receiving user of the data set or file was relying on the center point of a land plot. We believe the latitude and longitude system of coordinate sets is the most accurate system to attach to our data set or file to establish a user defined geographic location identity. There is not currently an effective method afforded access to by the user specifically to use currently available mobile devices and interactive GPS capabilities effectively and efficiently for direct interaction with highly specific locations to the user.

Open Street Map is an open source initiative in which volunteer contributors provide mapping data and relevant information to a centralized source of distributed mapping information such as bike pathways, college campuses, cafes, and other relevant map associated routes and locations to create a more up-to-date navigation experience for those that access this community driven mapping initiative. Its scope of purpose and intended use are obviously different from the presented method and its intent as a solution provided the individual user of the UPS-enabled mobile device experience.

While the contributors of this system may actually be the owner of a particular location they are submitting to the map system generated by Open Street Map. Open Street Map does not exclusively provide a user account dedicated to the construction, storage, and distribution of user defined geographic location identities designed. Nor does Open Street Map provide the user with the ability to keep the location private, if desired, for their own purposes and only shared with select individuals. Open Street Map is designed specifically to create mapping data that is accessed and used by the accessing community at large and to capture location information that is made publicly available to be displayed on a publicly available map. In contrast, the method described herein specifically requires registered users or users granted permission to an application as the means of interacting with the user location identities that are deemed public by design and the user-defined location identities are not displayed on any publicly accessible map without permission.

U.S. Pat. No. 9,191,352 to Parmar et al., the subject matter of which is herein incorporated by reference in its entirety, describes an on-demand location sharing technique that protects the location of a client device until the user of the client device elects to share the location. Thus, the purpose of the location sharing is to allow a group of selective users to interact socially in an interactive manner and the system provides the capability to search locations of established locations or suggested locations that have been moderated and approved. The system can also search geotagged locations relevant to the needs of the collective users, such as an agreed upon meeting location for all those within the invited group to turn on their on demand tracking of each member in the select group for that particular event occurrence and can give and estimated time of arrival for each member of the invited group to that selected meeting location.

In contrast, the present invention is designed to create a significant increase in the effective and granular accuracy of user-specific representations of location and create a user location specific interactive database for a more productively specific user navigation experience operating a mobile navigation device. There is in fact a socially relevant interaction that will occur with the sharing of the highly specific user defined location identity file or data packet composed by the registered user with another user.

The present invention is not formatted as being a group social interactivity driven method, especially when compared to geosocially purposed methods that are intended to facilitate a multiple number of users present in the method at any given time and additionally track their movements. The presented invention is specifically designed only for providing the user with the ability to the user to compose an accurately specific user defined geographic location identity to a chosen geographical point, save it as a file or data set and store it, in the future access it personally to share, modify, or delete it, or give permission to other users and/or applications to access it in the future to use the location identity for an intended purpose, or, copy and adopt it for modification to suit the users specifically personal needs. Each of these composed location identities are individual files that the user stores within their own account. The only interactive activity is when the file is shared, accessed, or copied/adopted.

The definitive accuracy of a selected point on a satellite image is only limited by the capabilities of technology supplying highly detailed close up imagery to the user. The present invention has been able to increase the level of accuracy and efficiency of the user navigation experience as it relates to the discovery of these specific points because of the human element of discovery at the user end of the navigation experience. Providing the user specific selection of point on a satellite image that is intimately familiar to the user can provide highly specific user defined point location accuracy that is driven by this familiarity. This is a tremendous advance in accuracy in the user experience in location representation for the user to engage with any particular identified location. It addresses the possibility of obstacles that will hinder a navigable route, provides a proximity close enough to define a point that is hidden from human view, provides a level of intimate detail that can only be provided by human recognition, and provides many other obvious future solution attributes with implementation of the method described herein.

Another feature of the present invention is that it can provide a crossover point identification with a system of Indoor Positioning Systems (IPS), where the IPS will take over the navigation process and with the prospect of adding elevation to assist in creating a more finite point identification. For example, if a building has undergone the process of being geofenced and its internal environment is a known feature regarding its internal design, the present method can become an extremely powerful tool in the finite description of positions within an enclosed structure that is out of signal range of the global satellite imagery. This is a powerful solution to many technological obstacles currently facing the global navigation industry as a whole. It is vital to the process and the convergent points in fact need to be commoditized for use within the navigation experience by banding these latitude/longitude convergent points coordinate sets to highly specific "user" defined geographic location identities and the presented invention provides a novel method of doing so.

The invention will now be described with reference to the following non-limiting examples. It is noted that the latitude/longitude coordinates in each example are the actual coordinates of the location described therein.

Example 1

This example illustrates navigation by car to an address where the location identity is on the end of the driveway instead of the house.

In this example, the street address of the house is 392 Woodland Street Glastonbury, Conn. 06033. However, street addresses alone can dramatically misrepresent a highly specific location for vehicular navigation to a location.

The latitude and longitude coordinate points for a Google Maps pinned location for this address is:

41.661408, −72.557882

However, the actual location of vehicular entry to this address is:

41.660663, −72.561332

Thus, the user would like to position/place the pin that designates the navigation address of the house at this street address at end the of the driveway entrance because the actual property and house are far off and/or not visible from the road. In addition, the placement of the pin that represents the property as a whole may also be located near another road in close proximity to the property which could alter the execution of the navigation experience by rerouting the user of the navigation device to an alternate address closer to the position of the pin marker.

Using the method described herein, the first user can establish the proper navigation location identity for the home by:
1) Opening the API with the first user's specific account;
2) Opening a satellite image and selecting the point at the end of the driveway that intersects with the street directly on the navigable route by vehicle a point on the satellite image to acquire the specific latitude and longitude coordinate set for this particular geographical point.
3) Adding a personalized description (i.e., "Driveway Entrance")
4) Adding a digital picture of the driveway entrance and placing a visual marker on the digital picture to signify the proper entrance location as a visual aid to those that receive this location identity to use for navigation to this home address.

Example 2

Home Delivery Convenience—Establishing location identities for spots around a building used by service companies or for deliveries.

There may be many locations within a particular property that require visitation by service and delivery personnel.

In particular, a homeowner may wish to mark the location for home fuel oil delivery as the filler pipe in the front garden of a house. It is extremely useful to have this location clearly identified and its location marked/defined so as to produce an efficient engagement by any person not familiar with its specific location, especially if the filler pipe was buried in the snow. Using the described method allow a delivery person to more quickly and easily locate the proper filler pipe to safely and efficiently make a delivery to this location.

Using the method described herein, the first user (homeowner) can establish the proper navigation location identity for the filler pipe by:
1) Opening the API with the homeowner's specific account;
2) Opening a satellite image and selecting the filler pipe on the satellite image to acquire the specific latitude and longitude coordinate set for this particular geographical point. Using the same street address as in Example 1, the geographical coordinates of the filler nozzle are: 41.721305, −72.511413
3) Adding a personalized description (i.e., "Fuel Oil Filler Pipe")
4) Adding message notes relevant to the delivery location attached to the particular location identity (i.e., no heavy trucks allowed in driveway, which may require an extra person required to be present to assist with the fuel oil pumping hose)
5) Adding a digital picture of the location of the filler pipe.
6) Sending a data file comprising the coordinate points and the message notes to the fuel oil service provider.

Example 3

Establishing a meeting place for any number of folks without the need for tracking everyone.

Location sharing products assume that everyone wants tracking to be a part of the location sharing task when in reality, most folks only want to share a physical geographic location.

Figure 6:
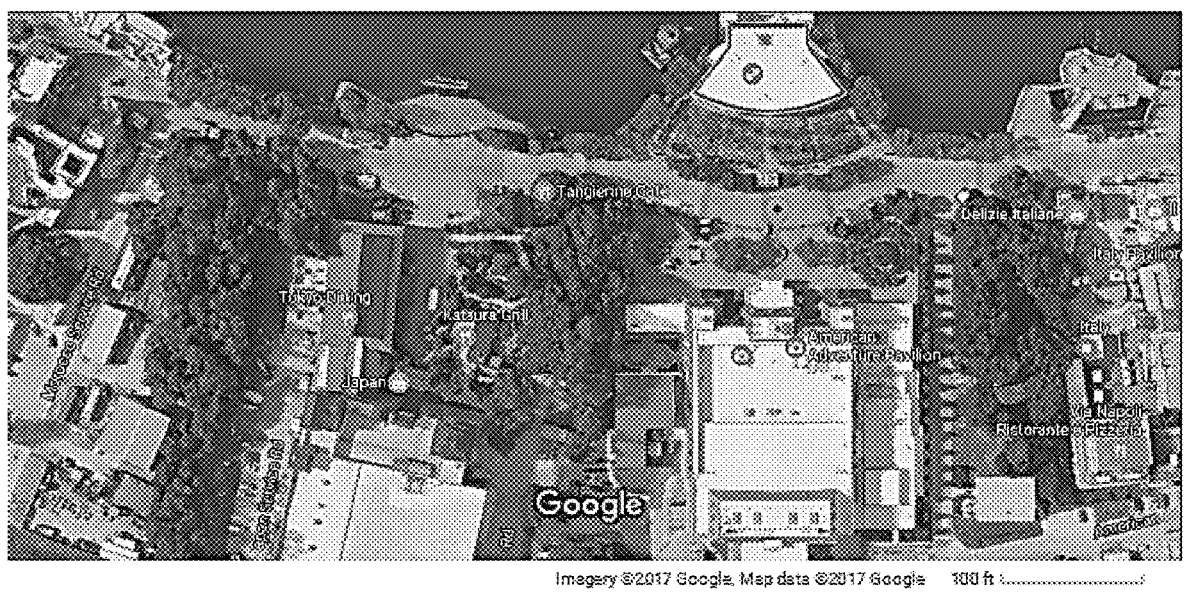
FIG. 6 depicts a map view of the coordinates of a geographic location identity for a meeting location at Epcot in Walt Disney World, Orlando, Fla.

In this Example, the user would like to establish a Location Marker for a specific meeting place for a group of families at a certain spot next to the fountain across from the America Gardens Theater at Disney World to meet at a certain time (coordinates 28.367821, −81.549354, as set forth in FIG. 6).

This location identity can become a permanently saved location or a location that is temporary and self-deletes after a certain period of time. The location would be selected by the first user and a location identity would be created for that chosen meeting point using the herein described method.

For this example, this GEOLOID file constructed by the first user is established as a temporary file designed to self-delete after end of the family trip. The first user sends this GEOLOID file to each of the second users in the group of families using the method application. Each second user has the option to be able to either keep the GEOLOID file temporary as designed by the first user, or, adopt the GEOLOID file for that second user to retain and use again in the future with the second users own personalized modification for use requirements.

While the original first user file that is constructed as a temporary file which is set to delete at the end of a specified time, the copy of the file by adoption by the second user has now become a permanent file that resides in the user account of that second user as a "first user file" and can be used by that second user in this example to use and share as a "first user fully modifiable file.

Example 4

This example demonstrates use of the invention by a municipality in order to establish location identities of utility transformer boxes stationed close to the street curb. These transformer boxes that are positioned close to the street in snow belt areas routinely get completely covered with snow during medium to large storms. It is a common and costly occurrence that these boxes can get severely damaged or destroyed by heavy equipment used during snow removal.

Using the method described herein, a utility company can mark locations of utility/transformer boxes in a municipality and create location identity files for each utility/transformer box. As an example, one coordinate set of a utility/transformer box is 41.719687, −72.613517.

The location identity file can include a photograph with a pin marker showing its location at its center and the dimensions of the box can be provided in the written description. Thus, heavy equipment such as a front bucket loader can proceed with caution when digging out in this location.

Additionally, the utility company itself that owns the utility box can list a location identity for the utility box to be used in the dispatch of service crews to work on the utility box. The utility company would also have a unified communication method to submit the location of these boxes to the municipality that works around them.

Example 5

Another municipality use involves marking fire hydrants for specific locations with attribute details laid out within the descriptive content in the location identity data set.

Oftentimes, there may be multiple fire companies coming in from surrounding areas to help fight a fire.

Figure 7:
FIG. 7 depicts a map view of the coordinates of a geographic location identity for a fire hydrant in Glastonbury, Conn.

If the fire hydrants are listed with an established location identity, they will first of all be easy to find for visiting fire companies from other towns and these visiting fire companies can be dispatched in advance to the location with perfect accuracy (for example, a fire hydrant is located at 41.713846, −72.609531) as illustrated in FIG. 7.

In addition, any unique attributes related to any particular hydrant can be listed on the location identity descriptive data. The situation in regards to fire hydrants in snow belt areas is the same as in Example 4. By using the herein described method to give the fire hydrants a specific location identity, a considerable savings in repair and replacement cost can be realized by the municipality.

Example 6

Another municipality use for the invention described herein involves a school district using the method of the invention to mark bus stop locations for students. Bus stops are ever evolving in location in relation to where students live depending on the grade the child is in from year to year and may need to change midway through the year depending on student activity. Additionally, it is not always easy to share a bus stop location with a sitter or relative if a student needs to be met at the bus stop to be picked up.

In most cases, school bus stops are located centrally for students to all gather coming from relatively equal distance around its location and not always directly located at a specific address. For example, the bus stop may be located in a conjoined area between two or maybe three different street address locations.

By placing a location identity on the bus stop and adding student names to the location for which the stop is allocated for, this information can be shared with the parents, showing them a specific satellite image with a familiar overhead view of exactly where the intended bus stop is to be for their child. Also, the bus driver has the exact location specifically as well as the students that are to be picked up at this specific location.

If the stop for any reason needs to change, a notification of change can be attached to the GEOLOID file and forwarded to all relevant parties showing the same or adjusted detail with the newly changed physical location so that all relevant parties may be quickly notified of the specific location of the new bus stop location.

Example 7

In the case of a college campus, specific entrance/access locations can be marked by various individuals for various purposes, including for easy efficient pedestrian navigation.

While there are maps that depict buildings where classes or speaking engagements are being held, in many instances, these buildings are very large with many entrances and exits used for different and separate purposes.

For example, the William Benton Museum of Art on the University of Connecticut campus has many different entrances. However, students that go to this building for class purposes are can be sent to a specific entrance. This entrance can be given a location identity and shared with all students and made available for all students to view and adopt as a saved location in their registered account to use for the beginning of their school experience. When the school has art showings for public invite, the main front entrance can have a location identity that can be shared to guide visitors directly to the art center efficiently and bring them to the specific entrance intended for the event. This scenario can play out at any and all specific locations anywhere on the campus relevant to the student population and their specific experience as well as for faculty and visitors alike all geared toward specific and personalized activities.

Example 8

In this instance of a commercial/retail location, specific location identities may be created for frequently used locations within one street address. Most often, a street address is not specific enough to effectively navigate a visitor to the first location a client or customer needs to get to which is usually a place to park.

Figure 8:
FIG. 8 depicts a map view of the coordinates of the entrance to the parking garage located on Columbus Boulevard in Hartford, Conn.

In most urban city locations, parking is not always directly connected to the actual location the user would ultimately be visiting. In this example, the address of the building at which the parking garage is located is Columbus Boulevard, in Hartford, Conn., but the entrance and exit from the parking garage is at the rear of the building and accessible only on Front Street as shown in FIG. 8. Thus, navigating to this entrance can be tricky if using the street address for either the businesses on Columbus Boulevard or the street address of the garage attached to the building as the entrance to the garage is on a different street and many of the surrounding streets are one-way streets.

By using the herein described method, the location identity of the garage entrance (coordinates 41.763184, −72.67142) can be established by a first user to share with a second user to navigate to, this second user would be brought directly to the entrance of the garage and not to the front of the building. A second GEOLOID file can be constructed and shared with the second user to show the second user the exact location of the store or business to navigate to by foot once they have parked the car.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

Finally, it should also be understood that the following claims are intended to cover all of the generic and specific features of the invention described herein and all statements of the scope of the invention that as a matter of language might fall there between.

What is claimed is:

1. A system for creating, accessing, and storing user-defined geographic location identity files for access by a user, the system comprising:
a database comprising a plurality of user-defined geographic location identity data files (GEOLOIDS) of one or more originating users, wherein each user-defined geographic location identity file comprises:
a) a geographic location identity representing a geographic location point manually created by a user, wherein the geographic location identity comprises a coordinate set of latitude and longitude, and
b) a descriptive identity of the geographic location identity or an item placed or located at the latitude and longitude coordinate set, wherein the descriptive identity is defined by the user for their own specific use or interaction requirements;
an application programming interface server configured to allow access to the database by means of an application programming interface, wherein the database is stored on the application programming interface server; and
a geographic location management application installable on a mobile device or workstation computer, wherein the geographic location management application comprises an application programming interface accessible by the one or more originating users, wherein the application programming interface comprises one or more menu screens, wherein the one more menu screens are configured to allow the user to access an account of the user to allow the user to at least one of create, modify, or share one or more geographic location identify files using information inputted into the one or more menu screens;

wherein the application programming interface server is configured to communicate with the geographic location management application installed on the mobile device or workstation computer over the internet and configured to provide access to the GEOLOID server over the internet;

wherein the mobile device or workstation computer operating the GEOLOID management device application is configured to grant access to the accounts of the one or more originating users or one or more subsequent users, to permit the one or more originating users or subsequent users access to the GEOLOID data files stored in the database of the one or more originating users or a subsequent user with appropriately granted permission; and wherein the GEOLOID management application is configured to permit a subsequent user to access their account through the application programming interface and to create a new geographic location identify file that includes an identical geographic location point previously selected by another user of the GEOLOID management application, wherein the subsequent user creates a new geographic location identity file by inputting a different descriptive identity associated with the identical geographic location point, wherein the new geographic location identify file is stored in the subsequent user's account.

2. The system according to claim 1, wherein the coordinate set of latitude and longitude is established to at least three decimal places.

3. The system according to claim 2, wherein the coordinate set of latitude and longitude is established to six or more decimal places.

4. The system according to claim 1, wherein the geographical location identity further comprises altitude or subterranean depth.

5. The system according to claim 1, wherein the descriptive identity comprises one or more of text, photographs, video clips and audio clips.

6. The system according to claim 1, wherein the user can perform a task comprising one or more of selecting the geographic location identity file, modifying or changing the data contained within the file, granting permission to another user or application to access and use the file, electronically transmitting the file to a global positioning system enabled application or device, and electronically transmitting the data file to another user.

7. The system according to claim 1, wherein the geographic location management device application does not actively navigate the user to any selected or specified geographic location point.

8. The system according to claim 1, wherein the geographic location management device application does not actively share the current location of the mobile device or workstation computer to another application user device, or, detect by geographic proximity any other application users established location identities.

9. The system of claim 1, wherein no permission is required for the subsequent user to select the identical geographic location point previously selected by another user of the GEOLOID management application to create the new geographic location identify file of the subsequent user.

10. A method of creating, accessing, and storing a user-defined geographic location identity file using the system for creating and storing user-defined geographic location identity files of claim 1, wherein the user creates, accesses, or stores the user-defined geographic location identity file using the geographic location management application by:

a) accessing a home screen of the application programming interface to access an account of the user;

b) accessing one or more menu screens to display an interactive satellite image map or an input screen for manually inputting latitude and longitude coordinates for a geographic location point identified by the user, wherein the user selects a geographic location point on the interactive satellite image map or manually inputs latitude and longitude coordinates for the geographic location point identified by the user;

c) inputting identifying information associated with the geographic location point, wherein the identifying information comprises a descriptive identity that describes the geographic location point identified by the user;

d) saving the location identity data file comprising the geographic location point identified by the user and the identifying information associated with the geographic location point identified by the user to the database stored on the application programming interface server.

11. The method according to claim 10, wherein the descriptive identity comprises one or more of text, photographs, video clips and audio clips.

12. The method according to claim 10, wherein the user accesses their account on the application programming interface of the geographic location management device application to engage a third party navigation application to navigate the user to the geographic location point.

13. The method according to claim 10, wherein the user accesses their account on the application programming interface of the geographic location management device application to provide the geographic location identity file to a subsequent user, wherein the geographic location identity file is configured to engage with a third party navigation application, wherein a subsequent user can engage a third party navigation application to navigate the subsequent user to the geographic location point.

* * * * *